(12) United States Patent
Grimm

(10) Patent No.: US 6,270,103 B1
(45) Date of Patent: Aug. 7, 2001

(54) SINGLE TRACK TWO-WHEELED VEHICLE

(76) Inventor: Friedrich Grimm, Zuericherstrasse 18, 70376 Stuttgart (DE)

( * ) Notice: Subject to any disclaimer, the term of this patent is extended or adjusted under 35 U.S.C. 154(b) by 0 days.

(21) Appl. No.: 09/214,341

(22) PCT Filed: Jul. 8, 1997

(86) PCT No.: PCT/EP97/03603

§ 371 Date: May 17, 1999

§ 102(e) Date: May 17, 1999

(87) PCT Pub. No.: WO98/01334

PCT Pub. Date: Jan. 15, 1998

(30) Foreign Application Priority Data

| Jul. 9, 1996 | (DE) | 196 27 557 |
| Mar. 8, 1997 | (DE) | 197 10 950 |

(51) Int. Cl.$^7$ ............................................ B62K 1/00
(52) U.S. Cl. ................... 280/270; 280/274; 280/281.1; 280/278
(58) Field of Search ............................ 280/263, 267, 280/268, 269, 270, 271, 274, 279, 281.1, 278, 287; 180/219

(56) References Cited

U.S. PATENT DOCUMENTS

| 378,253 | * | 2/1888 | Latta | 280/270 |
| 428,737 | * | 5/1890 | Withers, Jr. | 280/270 |
| 451,080 | * | 4/1891 | Stroud | 280/270 |
| 1,808,887 | * | 6/1931 | Dunkley | 280/270 |
| 3,294,416 | * | 12/1966 | Carnielli | 280/281.1 |
| 3,909,043 | * | 9/1975 | Black | 280/269 |
| 4,389,055 | * | 6/1983 | Cockburn | 280/274 |
| 4,516,647 | | 5/1985 | Novak . | |
| 4,867,467 | * | 9/1989 | Huidekoper | 280/279 |
| 5,450,915 | | 9/1995 | Li . | |
| 5,451,071 | * | 9/1995 | Pong et al. | 280/274 |
| 5,456,481 | * | 10/1995 | Allsop et al. | 280/274 |
| 5,485,893 | * | 1/1996 | Summers | 280/263 |

FOREIGN PATENT DOCUMENTS

| 79 225 | 4/1894 | (DE) . |
| 98 366 | 4/1897 | (DE) . |
| 117 016 | 8/1899 | (DE) . |
| 0 258 509 | 3/1988 | (EP) . |
| 982 683 | 6/1951 | (FR) . |
| 2 531 025 | 2/1984 | (FR) . |
| 93 21055 | 10/1993 | (WO) . |

\* cited by examiner

Primary Examiner—Daniel G. DePumpo
(74) Attorney, Agent, or Firm—Paul Vincent

(57) ABSTRACT

The invention relates to a single-track two-wheeled vehicle, in particular a bicycle, electric bicycle, electric scooter or motor scooter. The vehicle comprises a front section and a rear section which are both pivotably connected to each other by a pivot mechanism (1–4) arranged substantially centrally between the front and the rear wheel. The front section comprises a front wheel suspension with the front wheel (11), a handlebar (21) offset towards the front in relation to the pivot mechanism (1–4), and a connection member (21') of the handlebar (21). The rear section comprises a rear wheel suspension with the rear wheel (10) and a saddle support (26') on which the saddle (26) is mounted. A drive unit (40–53) is provided which is either part of the front section or the rear section, the front wheel suspension and the connection member (21') on which the handlebar (21) is mounted forming a first unit which cannot be rotated. The rear wheel suspension and the saddle support (26') form a second unit which cannot be rotated, the saddle (26) being offset to the rear in relation to the pivot mechanism (1–4), and the drive unit (40–53) acting either on the front wheel (11) or the rear wheel (10).

43 Claims, 21 Drawing Sheets

SINGLE TRACK TWO-WHEELED VEHICLE

BACKGROUND OF THE INVENTION

The invention concerns a single tracked two-wheeled vehicle in particular a bicycle, an electrical bicycle, an electrical scooter or a motorized scooter consisting essentially of a front portion and a rear portion connected to each other for pivoting by means of a pivot mechanism disposed approximately in the middle position between the front and the rear wheels, wherein the front portion comprises a front wheel suspension with the front wheel, a handle bars displaced relative to the pivot mechanism in the forward direction and a connection element for the handle bars, and the rear portion comprises a rear wheel suspension with the rear wheel and a saddle support bearing the saddle, and a drive unit is provided for belonging to either the front portion or the rear portion. A two-wheeled vehicle of this kind is disclosed in the publication DE 98366 C1.

The majority of conventional single track two-wheeled vehicles, whether they are bicycles, motorcycles or motor scooters, have a steering geometry with trailing action of the front wheel. The extension of the pivot axis joining the rear frame portion with the front fork and the handle bars has a point of intersection with the path of the vehicle which is situated several centimeters in front of the seating position of the front wheel. This trailing action effects a more stable straight travel for the two-wheeled vehicle. Every steering system for a single track two-wheeled vehicle has two contact surfaces with the travel path at the seating surfaces of the front and the rear wheels. Conventional two-wheeled vehicles effect steering of the vehicle through operation of the handle bars which are connected to and rotate together with the fork and the front wheel. Another measure influencing the stability of the vehicle is a displacement between the pivot axis and the front wheel axis. This displacement effects a slight lifting of the head of the fork during steering causing a restoring force leading to a more stable straight line dependence for the two-wheeled vehicle. When driving around curves, the operator must displace his weight and a tilting of the two-wheeled vehicle is required in order to effect a new equilibrium state compared to the initial situation. The equilibrium position thereby depends on the degree of steering of the front wheel relative to the rear wheel, the speed, and the weight of the operator. The non-centered disposition of the common pivot axis of the front and the rear frame units facilitates easy steering of a single track two-wheeled vehicle but has however associated problems.

The asymmetric configuration of the pivot axis in a single track two-wheeled vehicle of conventional construction causes the front and rear wheels to have a differing tilt with respect to the path traveled when going around a curve. This has, among other things, the consequence that unnecessary frictional forces occur during steering resulting e.g. in uneven wear on the tread surfaces of the front and rear wheels. A further aspect affecting the safety of the vehicle concerns the position of the wheels in curves. In curves, neither the front nor the rear wheel assume a perfect position for traveling through the curve. An optimum wheel position would be tangent to the curve with an equal tilt for both wheels. Traveling through curves in conventional two-wheeled vehicles therefore entails a danger of falling, in particular on slippery surfaces. In the event of insufficient friction between the wheels and the underlying surface, the steering acting on the front wheel alone leads to skidding of the front wheel and to crashing. Acceleration and braking in a curve can lead to skidding of the rear wheel and thereby also cause a crash. An additional disadvantage of conventional bicycles is evident during uphill travel. The increased pedal forces necessary thereby lead to compensation reactions on the steering wheel as result a of which the front wheel is deflected back and forth. This leads to a path which is not straight as well as to increased friction between the front wheel and the underlying surface. The uneven weight distribution on the front and rear wheels caused by the asymmetric configuration of the frame of conventional two-wheeled vehicles leads to additional loads on the frame which e.g. must be accepted by structures which are stiff when subjected to torques.

A single track two-wheeled vehicle categorizing the invention is disclosed in German patent DE 98366 C.

This patent describes a single track two-wheeled vehicle having a pivot axis disposed between a front and a rear wheel which is tilted in a forward direction and displaced from the middle towards the front. With this two-wheeled vehicle, the connecting element bearing the handlebars is borne for rotation in the front part of the frame. The steering motion of the handlebars is transferred to the rear frame portion via two circular segment shaped toothed racks. This configuration does not allow balanced deflection of the front and rear frame portions. The rotating bearing of the handlebars in the front frame member prevents direct transfer of steering motion from the front to the rear frame portion.

A bicycle has become known in the art by means of French patent 982,683 which can be transformed into a cart in a simple manner. In correspondence with this purpose, this bicycle has two vertical axes which are disposed on the left and the right of a central frame portion and which allow the front and the rear portions of the frame to pivot through 90° so that a single axis two-track cart is created. This configuration does not allow the pivot axis to be in a central position. The steering does not act equally on both wheels.

The so-called FLEVO-bike represents a current development as described in the magazine "Radfahren EXTRA" [Bike-riding EXTRA] 4.92. This bicycle also has a pivot in an approximately middle position between the front and the rear wheel. This pivot mechanism is however tilted to such a strong extent in the backward direction that the pivot axis intersects the vehicle path in front of the seating position of the front wheel. The stability of this bicycle is therefore realized through trailing action. In addition, the pedals form a non-rotating unit together with the front frame portion so that the steering capability of such a reclining operator bicycle is extremely limited.

SUMMARY OF THE INVENTION

Departing from the prior art mentioned, it is the underlying purpose of the invention to further improve a single track two-wheeled vehicle of this kind in such a fashion that the steering acts evenly on both wheels. This purpose is achieved in that the front wheel suspension and the connecting element bearing the handle bars form an intrinsically non-rotating first unit, and the rear wheel suspension and the saddle support form an intrinsically non-rotating second unit, wherein the saddle is displaced in a backward direction relative to the pivot mechanism and the drive unit acts either on the front wheel or on the rear wheel. The two-wheeled vehicle in accordance with the invention requires cooperation among three steering lever arms for influencing the motion of the pivot mechanism wherein the expression "steering lever arm" comprises the following steering elements;

a first upper steering lever arm joined without relative rotation to the front wheel suspension and acting from a forward position on the pivot mechanism, a second upper steering lever arm joined without relative rotation to the rear wheel suspension and acting on the pivot mechanism from the rear, and a lower steering lever arm likewise joined without relative rotation to the rear wheel suspension and acting either from the front or from the rear on the pivot mechanism.

The front upper steering lever arm is formed by the forwardly displaced position of the handle bars relative to the pivot mechanism. The rear upper steering lever arm is formed from the backward displacement of the saddle support relative to the pivot mechanism. The lower steering lever arm is formed by the displacement of the pedals or of the rigid foot rests relative to the pivot mechanism. The point of application of the lower steering lever arm is always between the handle bars and the saddle support.

In accordance with the invention, the points of force application for the steering lever arms form a triangle standing on its tip, with the pedals being disposed in the lower corner and the upper corners of which being defined by the handle bars and the saddle. The pivot axis of the pivot mechanism intersects this triangle between the upper corners.

By means of the mutually interacting steering lever arms, a secure steering and extremely sharp curving is facilitated for a single track two-wheeled vehicle having a centralized pivot mechanism. The folding-tilt-steering system proposed herein leads to a fundamental new handling capability for all two-wheeled vehicles categorizing the invention which is distinguished with respect to prior art of two-wheeled vehicles through a series of advantages which will be further described below. In addition, the structure and mechanical construction of single track two-wheeled vehicles can be substantially simplified compared to prior art. The weight can be reduced and the manufacture of fold-together bicycles can be substantially simplified. Bicycles having the front and the rear wheel units connected in either a vertically or horizontally displaced manner to a pivot mechanism have the particular advantage that both parts can be pivoted about the pivot mechanism with respect to each other in such a fashion that the bicycle can be folded together to half of its length with the parts seating in close proximity to each other. Further advantages are given through the integration of a multiple gear system, back pedal brakes, and/or an electrical or combustion engine drive within a frame having a middle pivot mechanism.

Further advantageous configurations of the invention are described in the dependent claims.

Performance

The intermediate location of the pivot mechanism between the front and the rear wheel transmits the weight of the operator along the shortest path to the wheel axes. In addition, the support elements can be more compact compared to the conventional frame construction which simplifies constructional difficulty and expense and reduces weight. The frame of a single track two-wheeled vehicle in accordance with the invention consists essentially of e.g. two triangles having a common side with the pivot axis. In some embodiments, the two triangles for suspension of the front and the rear wheel are identical which leads to additional simplification in manufacture of the frame. Distribution of static and dynamic loads via a system having two triangles provides structural optimization and facilitates a light construction.

In the simplest embodiment, the two-wheeled vehicle frame consists essentially of two straight or curved structures for the wheel suspensions which are connected to each other for pivoting via the pivot mechanism. The steering lever arm is joined without relative rotation to form a unit with the front wheel suspension, whereas the rear wheel suspension with the saddle support and a lower steering lever arm form an additional intrinsically non-rotating unit. The position of the pivot mechanism facilitates a centralized compact two-wheeled vehicle in accordance with the invention which can be folded together and allows construction of a foldable tubular frame. Frame constructions, subjected to flexural as well as tensile or compression loads, for the front and rear units can be borne in a pivotable manner with respect to each other using only one pivot mechanism to additionally reduce constructional difficulty and expense. Towards this end, the pivot mechanism comprises a guide pipe connected in a non-rotating fashion to one of the two units and connected to the second unit via an upper and a lower rolling bearing. The configuration of an upper and a lower pivot point in the pivot mechanism reduces the forces acting on the pivot mechanism and facilitates a lighter construction. In particular with vehicles with which the pivot mechanism is disposed at the height of or beneath the wheel axes, the torques acting on the pivot point can be accepted by a plate-shaped widened pivot. In a motor scooter having such a pivot in the floor of the vehicle, the lower steering lever arm is extended into a running board. Finally, the rear unit can accept a partially or completely transparent casing to protect the operator from wind and rain.

Performance

When one displaces the pivot mechanism of single track two-wheeled vehicles into a position intermediate between the tread surfaces of the front and the rear wheels, one fundamentally changes the performance of the vehicle. Operation of the steering lever arm leads not only to motion of the front wheel, rather both the front and the rear wheels are moved out of their base positions at which the longitudinal central axes of the front and the rear wheels lie along a straight line. In this manner, the separation between the seating surfaces of the front and the rear wheels is shortened and the frame folds along the pivot axis. Equilibrium in a curve is then only possible by tilting the pivot axis in the radial direction relative to the curve in dependence on the speed of travel.

When going around curves, both wheels are tangential to the arc of the curve being traveled through. In this fashion, frictional losses are minimized and both wheel surfaces are loaded evenly. The weight of the operator is equally distributed on the seating surfaces of the wheels. A further important advantage of the folding-tilt steering system is that only one half as large a steering deflection is required compared to a front steering system when going around a curve since the deflection angle is evenly distributed between both wheels. Steering is effected by pulling or pushing the front steering lever arm on the side facing the intended direction. A shifting of weight overcomes the restoring forces associated with straight travel, the two-wheeled vehicle folds together, the pivot axis tilts, and a new equilibrium situation is established. This unstable equilibrium position is stabilized during operation through the force action of the operator at five force introduction points: namely the right and left handles of the handle bars, the saddle, and the left and right pedals. The simultaneous introduction of force at all of these points leads to stabilization of the single track two-wheeled vehicle for any operating condition. The five point supported folding-tilt-steering system is a safe and easily operable steering mechanism for single track two-wheeled vehicles having a central pivot axis. The effectiveness of the lower steering lever arm is substantially improved using a gear mechanism since the force on the pedals can thereby be regulated. A steady and precise straight line travel is achieved by the operator by an intuitive balancing of the steering forces on the front steering lever arm imparted via the pedals. When starting up, the torques acting on the pedals in the pivot axis are compensated for by an opposing force on the steering lever arm. In this regard, the smaller the deflection, the smaller the amount of force necessary for steering. It is also possible to stand up from the saddle and to pedal while standing. When going uphill, the increased pedal forces on the lower steering lever arm effect precise and steady straight line travel. For downhill travel where high speeds can be obtained it is advisable to transfer a force into the pivot axis through light operation of back pedal brakes so that the front and the rear steering lever arms remain under tension to completely avoid the danger of alternating load reactions in the pivot axis which could be undesirable at high speeds. The same is true for a motorcycle or a motor scooter where the operator can influence the steering using his hands and feet. If the seat is shell-shaped good sideward containment is guaranteed to facilitate a completely safe travel operation even at extreme speeds. For straight travel, the pivoting mechanism is disposed at a bottom dead center. Each steering motion shortens the distance between the wheels and the pivot mechanism is lifted. When going around a curve, the pivot mechanism is therefore located at a higher position. The restoring forces necessary for a stable straight travel cause the system to always attempt to return to its initial state. Additional influencing of the operating properties within the context of this coupled folding-tilt-mechanism can be effected through a tilting of the pivot axis in the longitudinal direction or when the front and rear wheel suspension engage the wheel axes at a displacement therefrom. The steering motion in the pivot axis can be influenced by a steering damper e.g. in the form of a gas pressure spring connecting the rear and the front portions. The resistance of this damping element must be overcome for all steering motion. An additional possibility for influencing the steering properties is the use of resilient elements which engage the pivot mechanism and whose restoring forces must be overcome for all steering motions deviating from a straight line. Finally, the pivot mechanism can be further improved in such a fashion that the front and rear wheel suspensions move away from each other via guiding surfaces having oppositely directed pitches along the pivot axes to generate an additional restoring force.

The drive mechanism can act either on the front wheel or on the rear wheel or on both wheels. Important within the framework of the invention is the position the drive mechanism assumes relative to the pivot axes. In accordance with the invention, new and advantageous possibilities are given for the configuration of combustion engines, electrical motors and battery storage elements which will be more closely described in association with the figures.

In summary, a single track two-wheeled vehicle having a steering device evenly influencing the two wheels is superior to conventional systems due to the ideal interaction with the road. The safe and proper steering of a two-wheeled vehicle of the above mentioned kind under all operating conditions had been, up to this point of time, an unsolved problem. The configuration and cooperation of the steering lever arms proposed in accordance with the present invention and their embodiments leads to the resolution of this problem in the simplest of manners.

The invention is described more closely in the embodiments represented in the drawing.

DESCRIPTION OF THE PREFERRED EMBODIMENT

Figure 1:
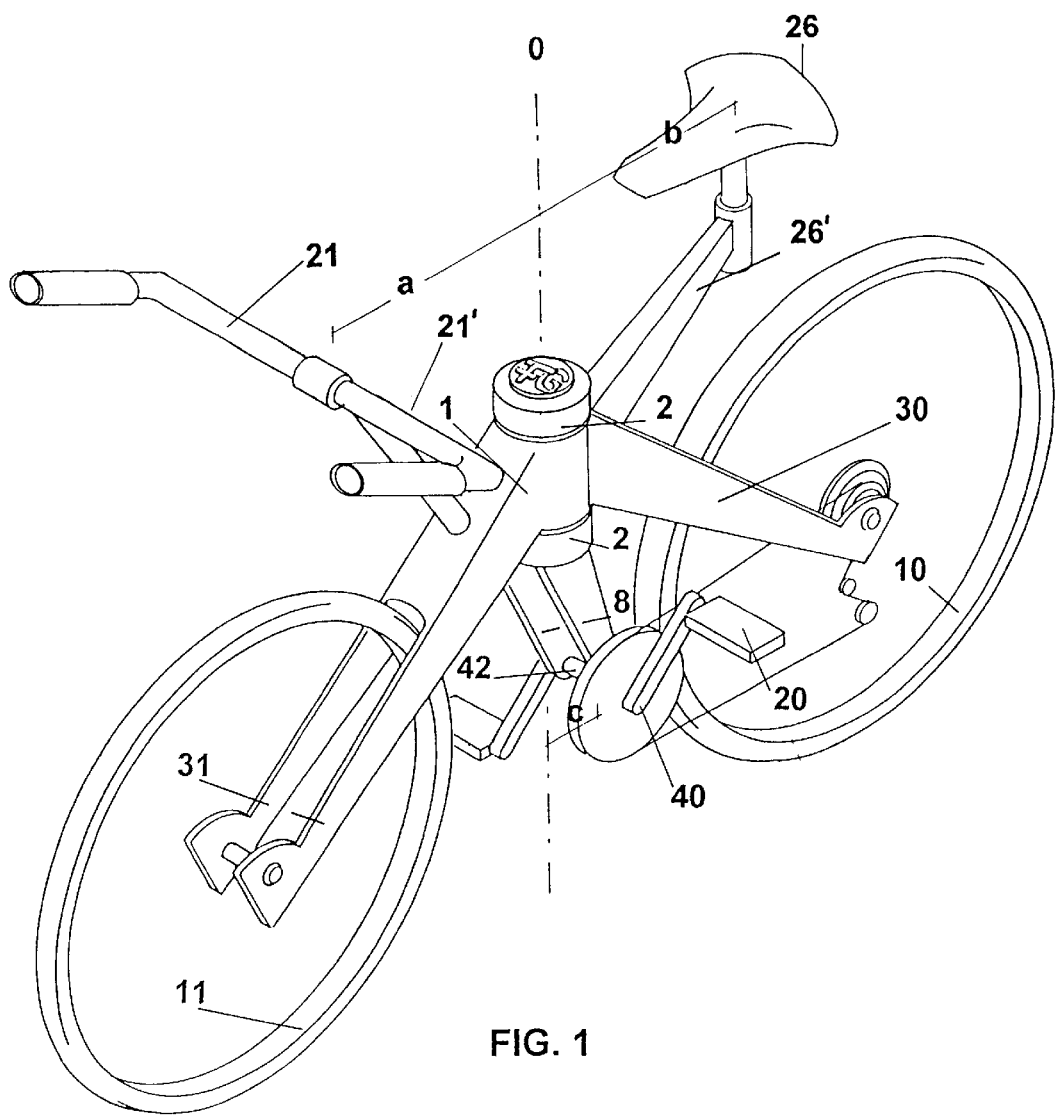
FIG. 1 shows a bicycle in accordance with the invention having a rear wheel drive and a vertical pivot mechanism in isometric view.

The figures show a single track two-wheeled vehicle, in particular a bicycle, electric bicycle, an electric scooter or a motorized scooter consisting essentially of a front member and a rear member connected for pivoting to each other by means of a pivot mechanism located approximately in a central position between the front and the rear wheel, wherein the front member comprises a front wheel suspension with the front wheel, a handle bars displaced in the forward direction relative to the pivot mechanism and a connection element for the handle bars, and the rear member comprises a rear wheel suspension with the rear wheel and a saddle support bearing the saddle. A drive unit is provided for in either the rear or the front member. Towards this end, one can recognize in each figure that the front wheel suspension (31, 33, 35, 37) and the connecting element (21') bearing the handle bars (21) form an intrinsically non-rotating first unit and the rear wheel suspension (30, 32, 34, 36) and the saddle support (26') form an intrinsically non-rotating second unit, wherein the saddle (26) is displaced in a backward direction relative to the pivot mechanism (1–4), and the drive unit (40–53) acts either on the front wheel (11) or on the rear wheel (10).

FIG. 1 shows an isometric overview of a bicycle in accordance with the invention. In this example, the front unit comprises the handle bars (21), the connecting element (21') and the fork (31), whereas the rear unit is fashioned from the saddle (26), the saddle support (26'), the fork (30) and a collar member for accepting the pedal bearing (42). Both intrinsically non-rotating units are borne for rotation relative to each other at the pivot mechanism. The pivot mechanism is formed by an upper pivot (1, 2) disposed above the wheel axes of the front wheel (11) and the rear wheel (10). The pedals (20) lie below the wheel axes and act on the pivot axis (0) in the form of a lower steering lever arm (c). The drive is a conventional pedal crank (40). A particular advantage is that the front and rear units are configured identically. The handle bars (21) and the saddle (26) are borne in a height adjustable fashion in the front wheel suspension (31) and in the rear wheel suspension (30), respectively.

Figure 2A:
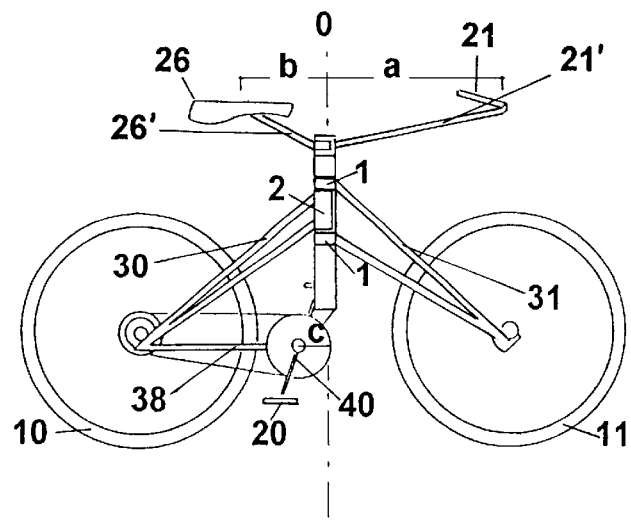
FIG. 2a shows a bicycle in accordance with the invention having rear wheel drive and a vertical pivot mechanism in a side view.

In the bicycle in accordance with FIG. 2a, the front wheel suspension (31) and the rear wheel suspension (30) engage the front wheel (11) and the rear wheel (10) below the wheel axes. They are formed by fork-shaped tubular frames. A rounded hollow section is located in the extension of the perpendicular pivot mechanism which is curved toward the rear wheel (10). The pedal crank (40) is located at the end thereof. Additional braces (38) are disposed between the rear wheel axis and the pedal crank (40) to accept the pedal forces on the lower steering lever arm (c). The bicycle also has the pivot mechanism (1, 2) disposed above the wheel axes.

Figure 2B:
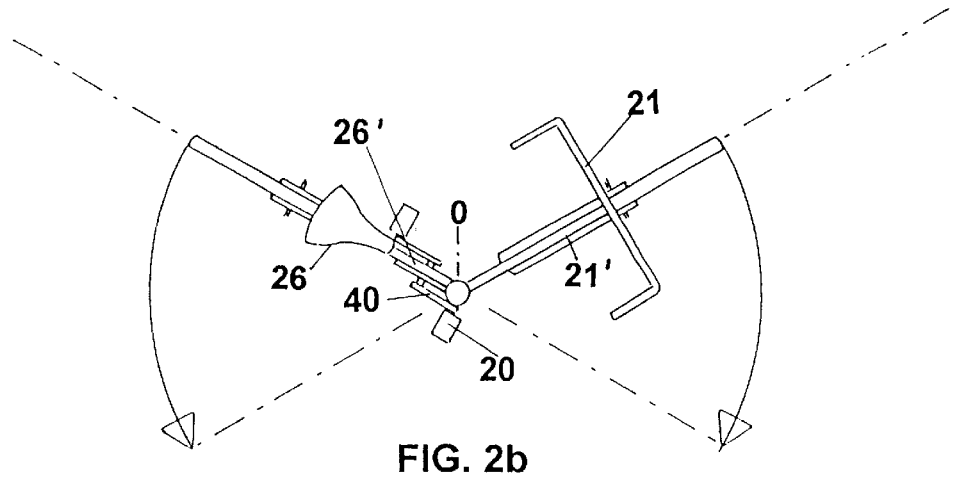
FIG. 2b shows a bicycle in accordance with the invention having rear wheel drive and a vertical pivot mechanism configuration in plan view.

FIG. 2b shows the bicycle in accordance with the invention in a partially folded position in plan view representing a operable deflection angle.

Figure 2C:
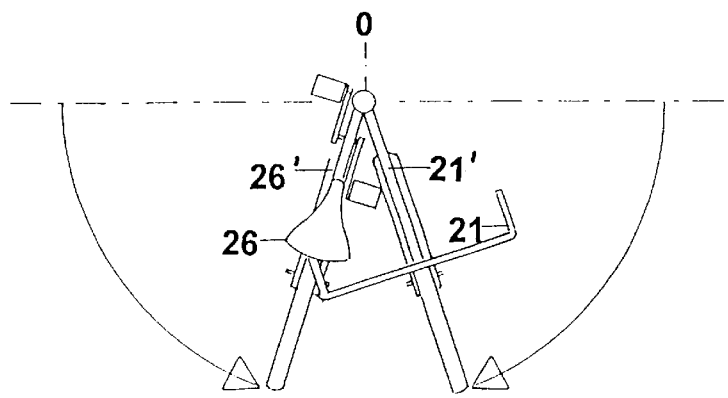
FIG. 2c shows a bicycle in accordance with the invention having rear wheel drive and a vertical pivot mechanism, folded together in plan view.

FIG. 2c shows the bicycle in accordance with the invention in a transport position in which the front and rear units are folded up together about the pivot axis (0).

Figure 3:
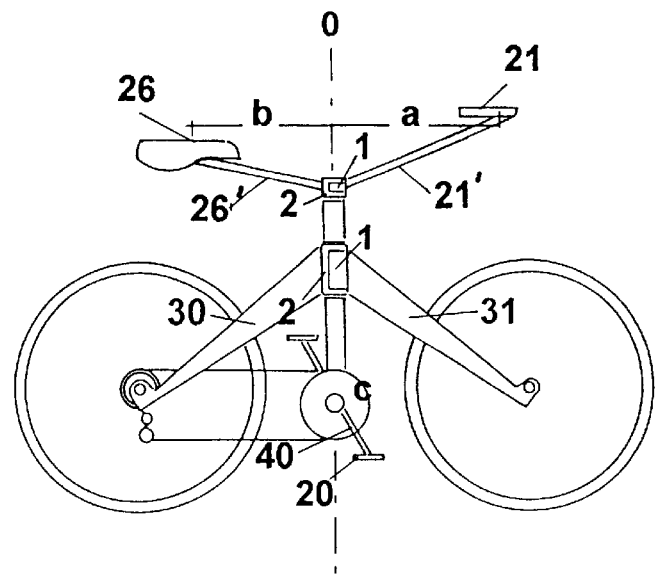
FIG. 3 shows a bicycle in accordance with the invention having rear wheel drive and a vertical pivot mechanism configuration in a side view.

FIG. 3 shows a bicycle in accordance with the invention with which the fork-shaped front wheel suspension (31) and the fork-shaped rear wheel suspension (30), the saddle support (26'), the handle bars (21) as well as the pedal crank (40) are connected to a common guiding tube defining the pivot axis (0). The pedal bearing for the pedal crank (40) is located on the lower end of the pivot mechanism and is connected to the rear unit (30) via a straight pipe section. The position of the pedals (20) along with the pedal bearing in the pivot mechanism stabilizes straight travel of the bicycle. The forked wheel suspensions (30, 31) are configured as load bearing shell structures and are connected with the axes of the front wheel and the rear wheel below the wheel axes and via a joining plate.

Figure 4:
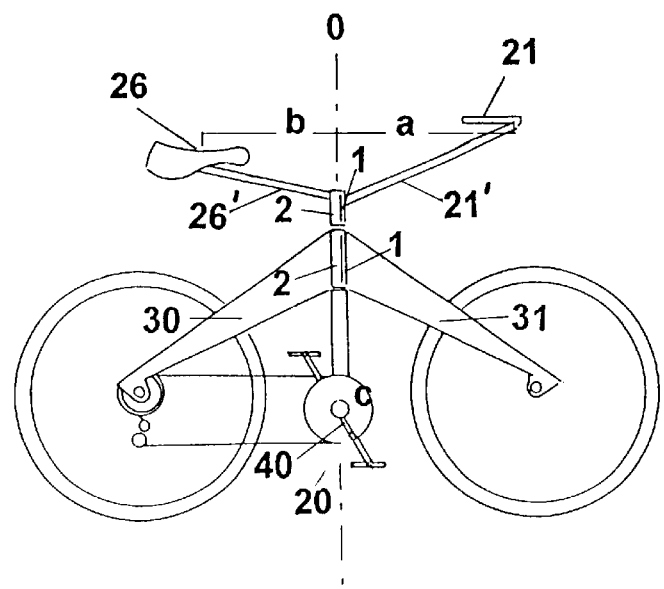
FIG. 4 shows a side view of a bicycle in accordance with the invention having rear wheel drive and a vertical pivot mechanism.

FIG. 4 shows a bicycle in accordance with the invention as shown in FIG. 3, wherein the front wheel suspension (31) and the rear wheel suspension (30) engage above the wheel axes on the front and rear wheels.

Figure 5A:
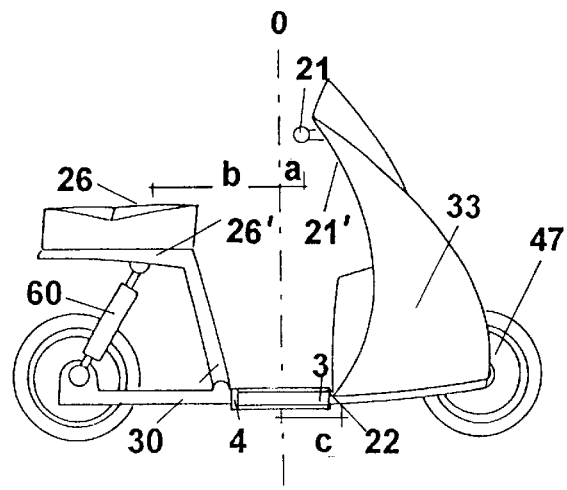
FIG. 5a shows a side view of an electric scooter in accordance with the invention having front wheel drive and a vertical pivot axes.

FIG. 5a shows an electrical scooter in accordance with the invention having front wheel drive effected by a wheel hub motor (47). The scooter consists essentially of two units which can be rotated about a common pivot axis (0), wherein the pivot (3, 4) is located below the wheel axes. The front wheel suspension (33) is configured as a shell construction, wherein the rear wheel suspension (30) is formed from tubular frames. Steering is effected by pulling or pushing on the upper steering lever arm (21) while simultaneously supporting the feet on the foot rests (22) acting as the lower lever arm.

Figure 5B:
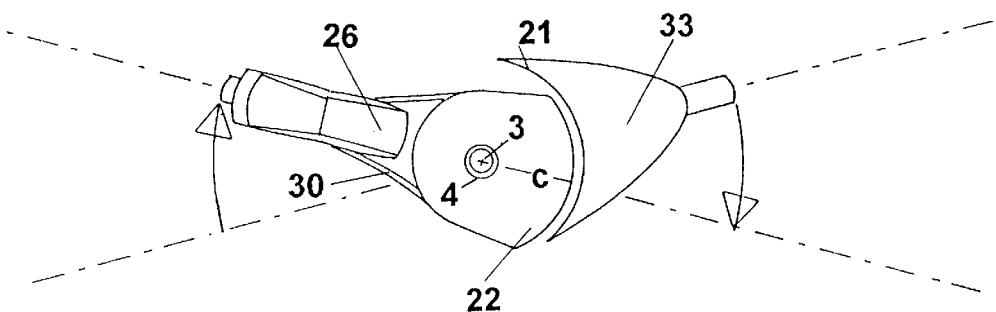
FIG. 5b shows a plan view of the electrical scooter in accordance with the invention having front wheel drive and a vertical pivot axes.

FIG. 5b shows an electrical scooter in accordance with the invention in plan view at an operable deflection angle.

Figure 6:
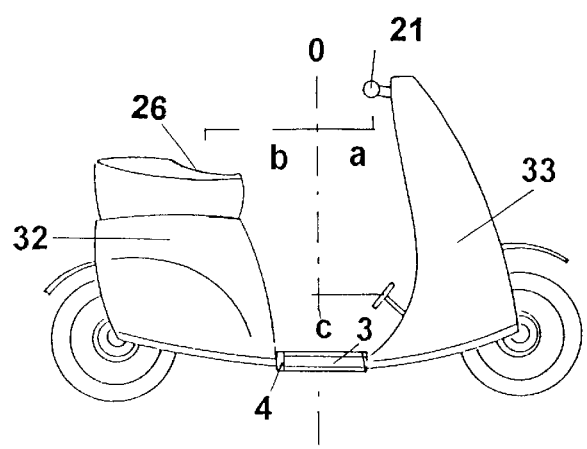
FIG. 6 shows a side view of a motor driven scooter in accordance with the invention having rear wheel drive and a vertical pivot mechanism.

FIG. 6 shows an electrical scooter in accordance with the invention corresponding to the construction of the scooter shown in FIG. 5, wherein both wheel suspensions (32, 33) have shell construction.

Figure 7:
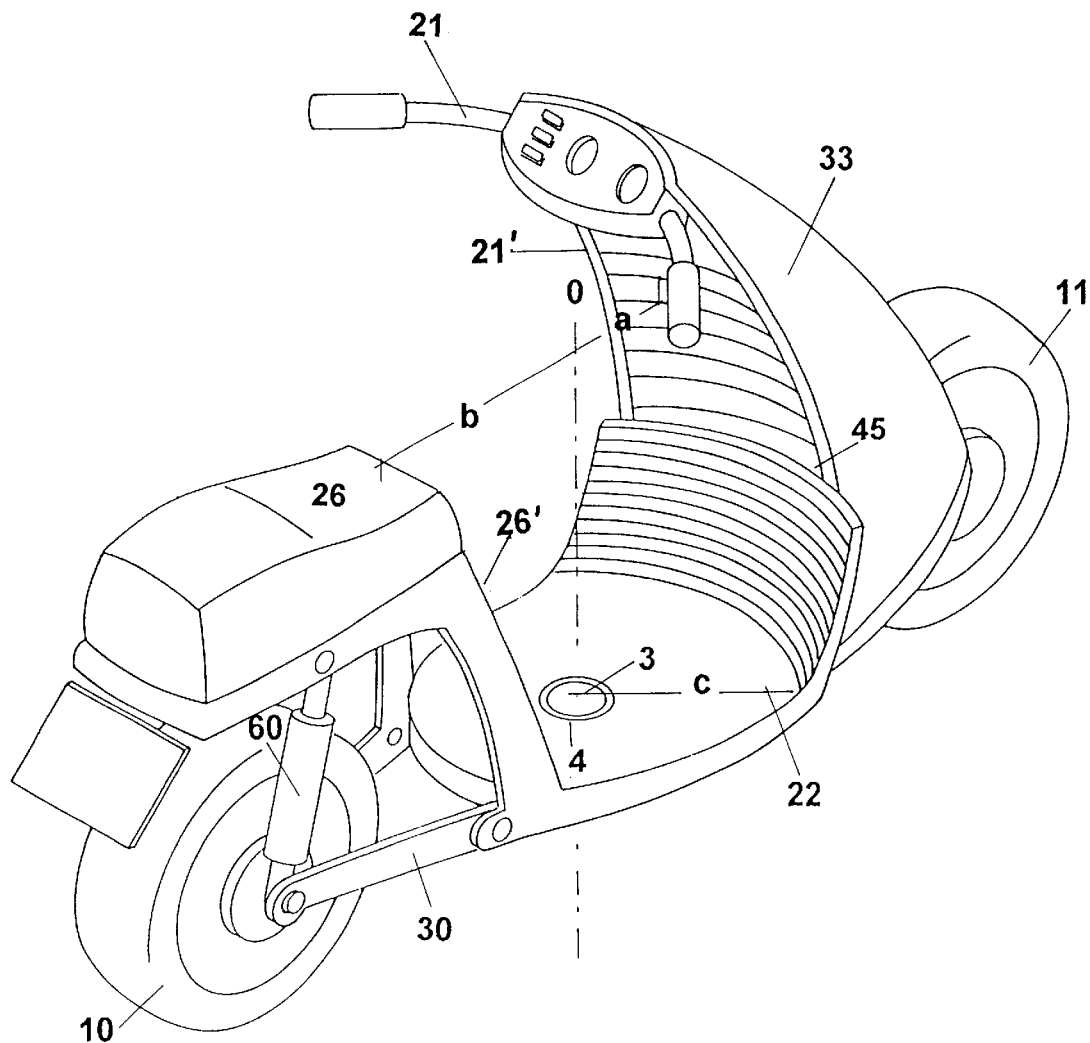
FIG. 7 shows a motorized scooter in accordance with the invention in an isometric view having front wheel drive and vertical pivot mechanism.

FIG. 7 shows a motorized scooter in accordance with the invention in isometric representation. The front wheel suspension (33) consists essentially of a self-supporting shell construction and the rear wheel suspension (30) is fork-shaped. The front and rear units are connected to each other by means of a disc-shaped pivot (3, 4) for rotation below the wheel axis. During steering, the steering lever arm (a) acts from a forward position, the steering lever arm (b) acts from the rear, and the lower steering lever arm (c) also acts from the front on the pivot axis (0). The disposition of the force introduction points for steering facilitates an easy and safe handling of the folding-tilt-steering system. The disposition of the pivot mechanism (3, 4) at the height of or directly below the wheel axes together with front wheel drive facilitates advantageous operation. The width of the scooter in the region of the pivot mechanism likewise facilitates, if desired, the installation of vibrational dampers acting on the pivot (3, 4). The front unit (33) is substantially simplified, compared to the conventional construction, since the pivot (3, 4) is located in the middle and the internal combustion engine (45) with all mechanisms needed for operation can be integrated within the aerodynamic casing of the shell structure. Towards this end, the rear unit (30) can be utilized as a resilient seat (26) for one to two people and the platform widened lower steering lever arm (22) can be used to transport objects.

Figure 8:
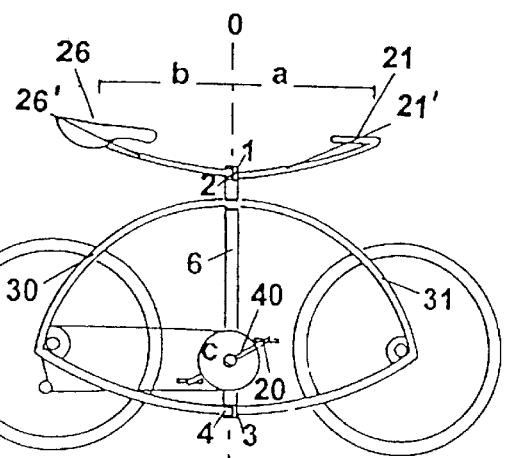
FIG. 8 shows a bicycle in accordance with the invention in side view having rear wheel drive and a vertical pivot mechanism.

FIG. 8 shows a bicycle in accordance with the invention having a vertical pivot mechanism and rear wheel drive. In this case, the upper pivot (1, 2) is disposed above the wheel axes, and the lower pivot (3, 4) is located below the wheel axes. A pedal crank (40) is introduced between the pivots (1–4) which, in turn, are connected by a hollow structure (6). Each of the front and the rear wheel suspensions (30, 31) are configured as a curved tubular frame. The lower frame member is lower than the lower bottom dead center of the pedal crank (40) so that the pedal crank (40) does not come in contact with the tubular frame even under extreme steering deflection. The low center of gravity of this system leads to a stable straight line operation, since the supporting members of the frame join onto the wheel axes from the lower and from the upper direction. In this case as well, the pedal crank (40) directly engages at the pivot axis (0) and is disposed as a lower steering lever arm (c) between the saddle (26) and the handle bars (21), the connecting elements of which (26' and 21' respectively) form the upper steering lever arm (a, b).

Figure 9:
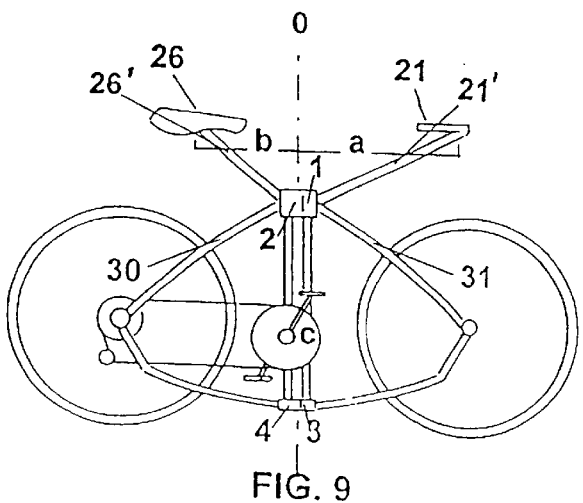
FIG. 9 shows a bicycle in accordance with the invention having rear wheel drive and a vertical pivot mechanism in a side view.

FIG. 9 shows a bicycle with which the front and the rear wheel suspensions (30, 31) are each configured as triangular-shaped tubular frames connected together via an upper pivot (1, 2) and a lower pivot (3, 4).

Figure 10:
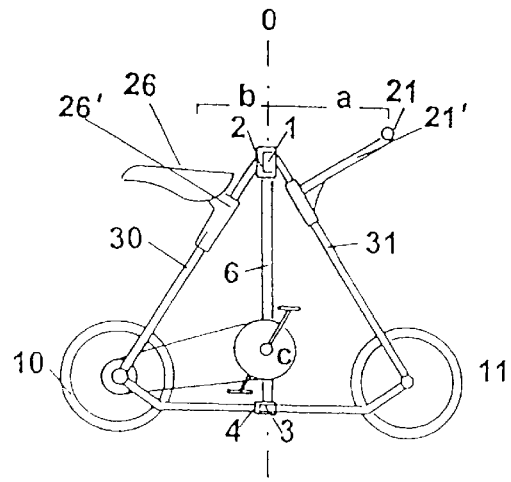
FIG. 10 shows a side view of a bicycle in accordance with the invention having rear wheel drive and a vertical pivot mechanism.

FIG. 10 shows a bicycle with which the front and the rear wheel suspensions (30, 31) form a triangle wherein the upper pivot (1, 2) is located in the upper corner of the triangle with the wheel axes of the front wheel (11) and the rear wheel (10) defining the two lower corners of the triangle and the lower pivot (3, 4) divides the side of the triangle facing the road in half. Both pivots (1–4) are connected to each other by means of a hollow structure (6). The bicycle has 18 inch wheels (10, 11). The saddle-support (26') and the connecting element (21') for the handle bars (21) are attached to the wheel suspensions (30, 31) such that their heights can be adjusted.

Figure 11:
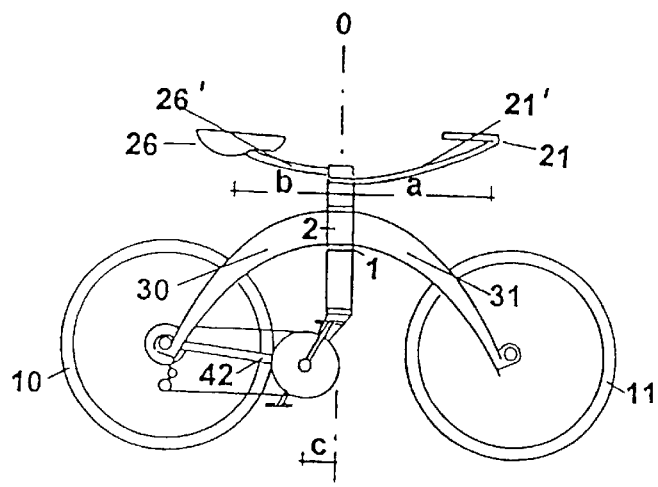
FIG. 11 shows a side view of a bicycle in accordance with the invention having rear wheel drive and a vertical pivot mechanism.

FIG. 11 shows a bicycle in accordance with the invention having a fork-shaped curved wheel suspension (30, 31) connected to the front wheel (11) and the rear wheel (10) within the wheel separation defined by the wheel axes. Two additional braces connect the pedal bearing (42) with the rear wheel axis and pass the pedal and steering forces into the rear unit.

Figure 12:
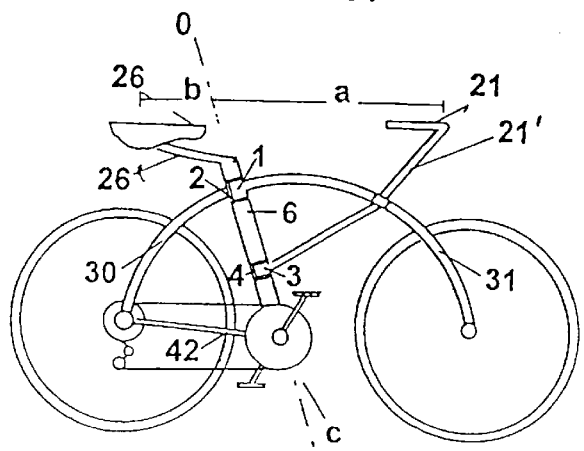
FIG. 12 shows a bicycle in accordance with the invention having rear wheel drive and a pivot mechanism tilted in a backward direction in side view.

The bicycle shown in FIG. 12 has a pivot mechanism titled in a rear direction. In this case as well, the braces stabilize the pedal bearing (42). The forward larger unit is stabilized by an additional brace. In this case, the saddle support (26') is coaxial with the pivot mechanism and is connected to a guide pipe (6) at which the rear wheel suspension (30) and the front unit are connected to each other for pivoting.

Figure 13:
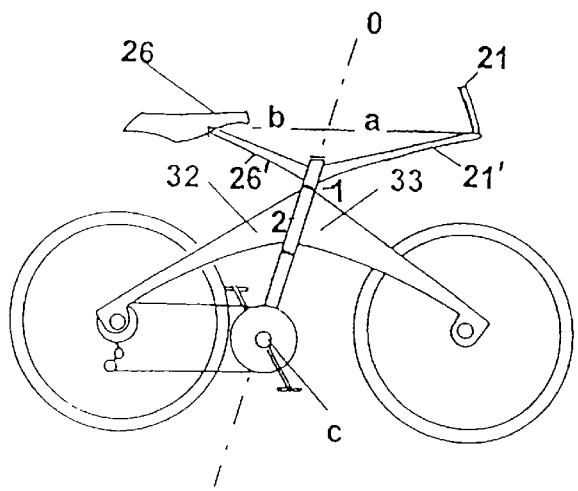
FIG. 13 shows a bicycle in accordance with the invention having rear wheel drive and a pivot mechanism tilted in the forward direction in side view.

FIG. 13 shows a bicycle in accordance with the invention having a pivot mechanism tilted in a forward direction. The wheel suspensions (32, 33) are configured as self-supporting shell constructions made from sheet metal or plastic. The saddle (26) and the handle bars (21) extend outwardly from the pivot mechanism. The elastic deformation of the connecting elements (21', 26') is utilized for resilient suspension of the saddle (26) and the handle bars (21).

Figure 14:
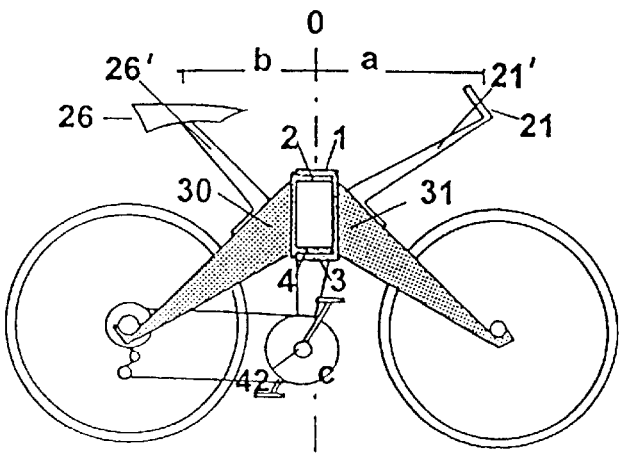
FIG. 14 shows a bicycle in accordance with the invention having rear wheel drive and a vertical pivot mechanism in side view.

The bicycle shown in FIG. 14 has two identical wheel suspensions (30, 31) formed as fork-shaped hollow box cross sections. The saddle support (26') and the steering lever arm (21') have adjustable heights and are mounted to the wheel suspensions (30, 31). The pedal bearing (42) is displaced slightly in a backward direction relative to the pivot mechanism, lies below the wheel axes, and is borne by a fork-shaped structure engaging the lower pivot (3, 4).

Figure 15:
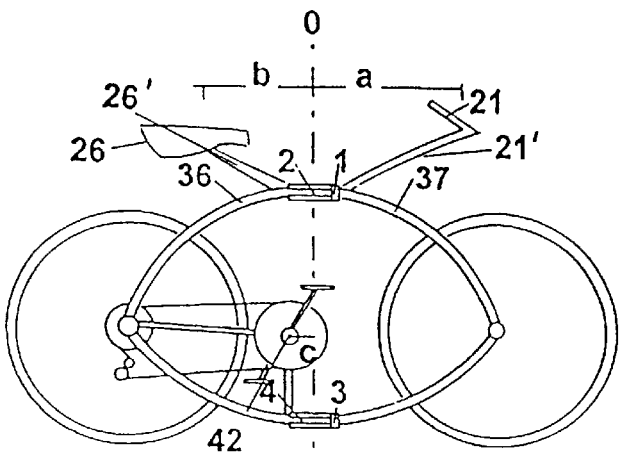
FIG. 15 shows a bicycle in accordance with the invention having rear wheel drive and a pivot mechanism tilted in the backward direction in side view.

The bicycle shown in FIG. 15 has wheel suspensions (36, 37) configured as resilient elements. There is no structural connection between the upper pivot (1, 2) and the lower pivot (3, 4). In this manner, the front unit and the rear unit constitute an interacting resilient element. In this embodiment the separation between the wheels increases under abrupt load. A reinforced portion of the rear wheel suspension (36) accepts the pedal bearing (42).

Figure 16:
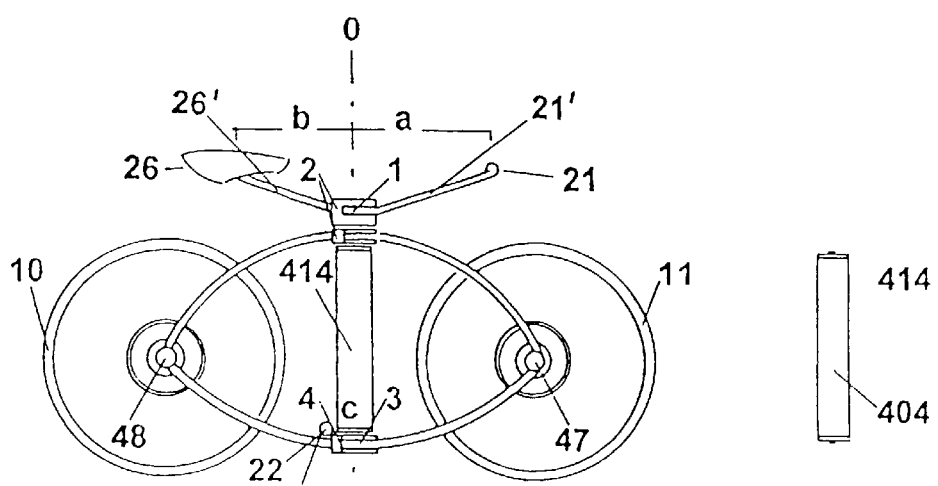
FIG. 16 shows an electrical bicycle in accordance with the invention having front and rear wheel drive and a vertical pivot mechanism in side view.

FIG. 16 shows an electrical bicycle in accordance with the invention having a construction corresponding to that of the bicycle in FIG. 15, wherein drive is effected by two wheel hub motors (47, 48) in the front wheel (11) and the rear wheel (10). A removable container (414) is inserted between the upper pivot (1, 2) and the lower pivot (3, 4) and serves to accept storage cells (404). The storage cells (404) can be easily removed from the vehicle and charged. For downhill stretches, the wheel hub motors (47, 48) can be utilized to produce current. The foot rests (22) are disposed below the wheel axes.

Figure 17:
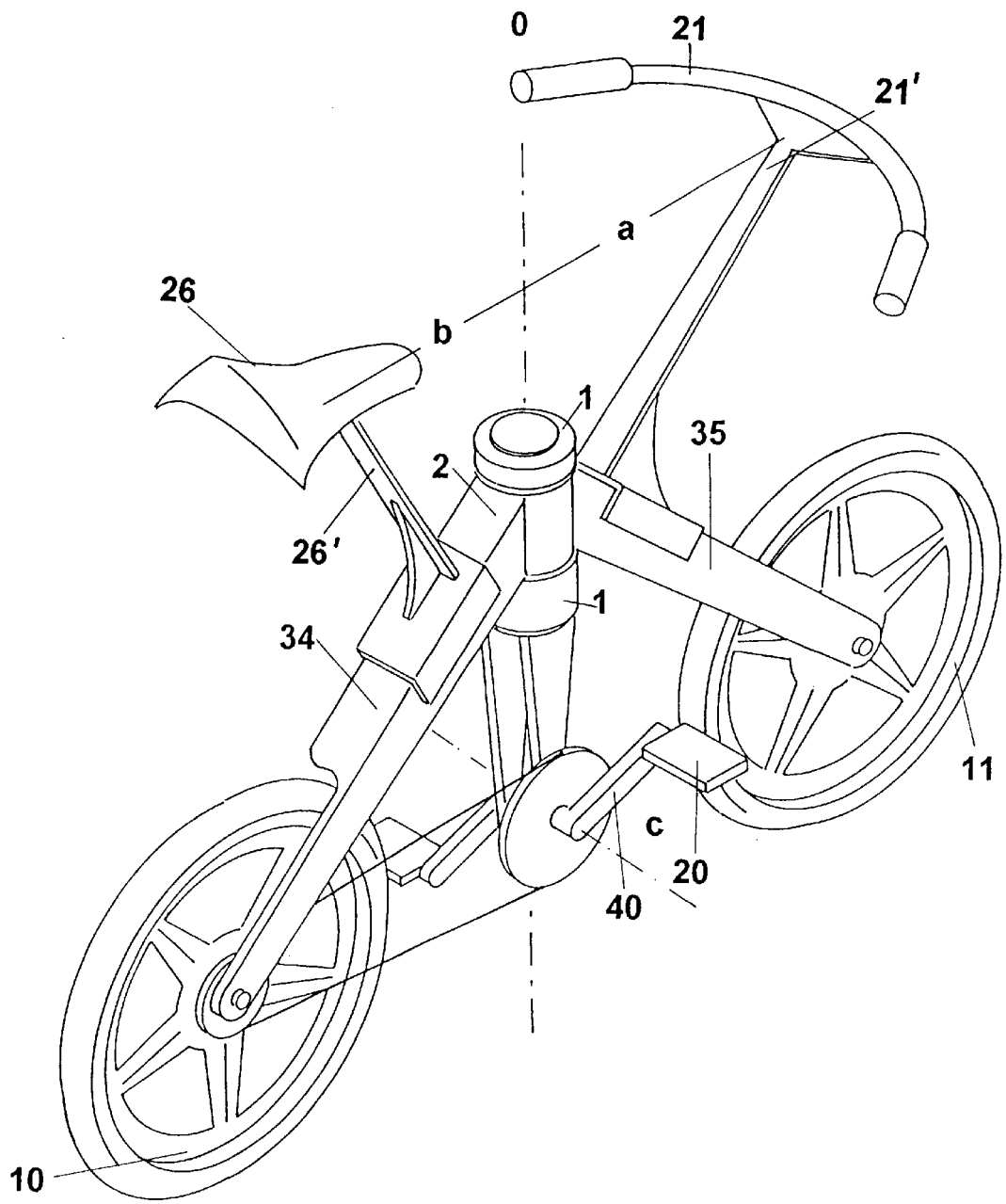
FIG. 17 shows a folding bicycle in accordance with the invention having rear wheel drive and a vertical pivot mechanism in isometric representation.

FIG. 17 shows a bicycle in accordance with the invention with which the wheel suspensions (34, 35) are formed as one-sided arms. The symmetrical construction facilitates folding together into a minimum volume.

Figure 18:
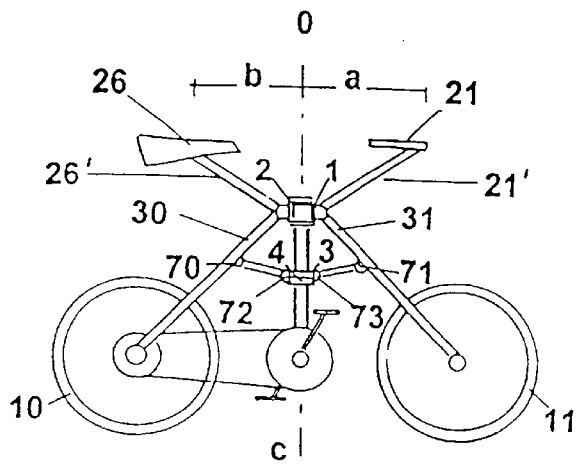
FIG. 18 shows a folding bicycle in accordance with the invention having rear wheel drive and a vertical pivot mechanism in side view.

FIG. 18 shows a folding bicycle. The attachment locations (70–73) of the front and the rear wheel suspension (30, 31) are configured herein as pivot mechanisms (70, 71). The bicycle can be folded together into a compact bundle through release of a hinge locking mechanism on the pivot mechanism.

Figure 19A:
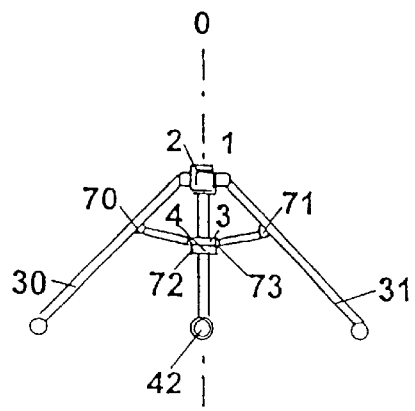
FIG. 19a shows a tubular frame for a folding bicycle in accordance with the invention in the unfolded state.
Figure 19B:
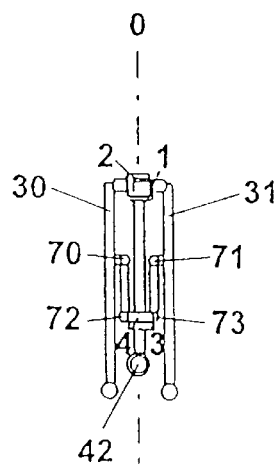
FIG. 19b shows a tubular frame for a folding bicycle in accordance with the invention in the folded together state.

FIGS. 19a and 19b show the tubular frame of the bicycle in FIG. 18 in the unfolded and folded states.

Figure 20A:
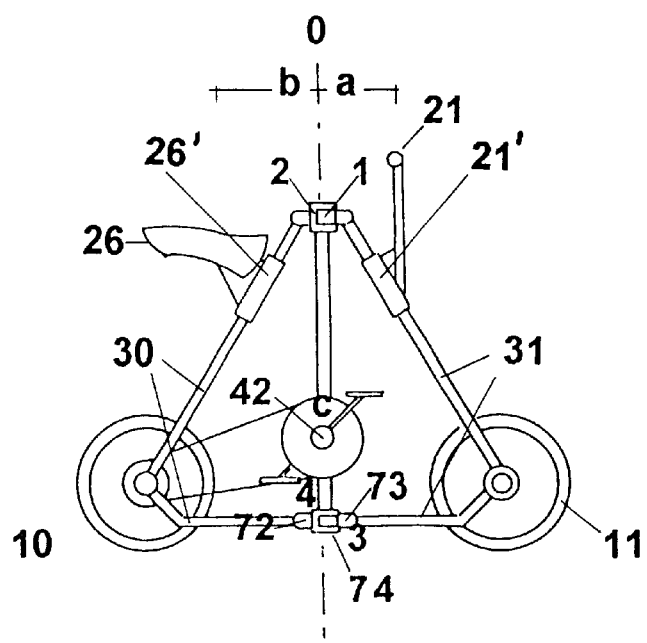
FIG. 20a shows a folding bicycle in accordance with the invention in side view in a position ready for operation.
Figure 20B:
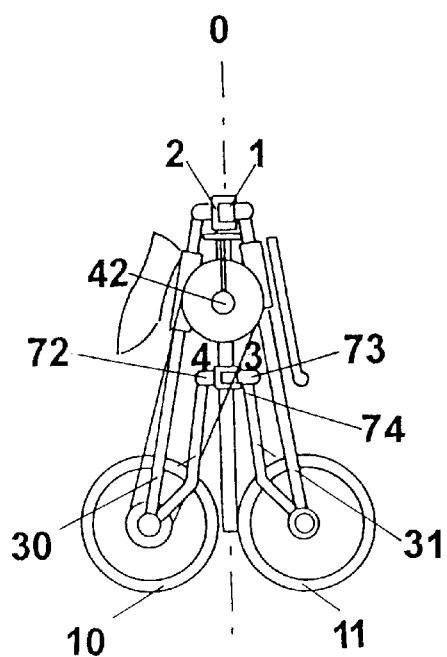
FIG. 20b shows a folding bicycle in accordance with the invention in a folded together state.

FIG. 20a shows a folding bicycle ready for operation, whereas FIG. 20b shows the folded together bicycle. A locking mechanism (74) is disposed on the lower end of the pivot mechanism to which the pedal bearing (42) and the lower braces for the front and the rear wheel suspensions (30, 31) are connected. Release of the locking mechanism (72, 73) allows the bicycle to be folded together into a compact bundle. The separation between the pedal bearing (42) and the axis of the rear wheel (10) remains constant during the folding procedure, so that the drive belt or chain does not become disengaged. The saddle support (26') and the handle bars (21) are configured as slanted modules whose heights can be adjusted at the front and rear wheel suspensions (30, 31). This folding bicycle is extremely light and can be transported all over when folded together.

Figure 21:
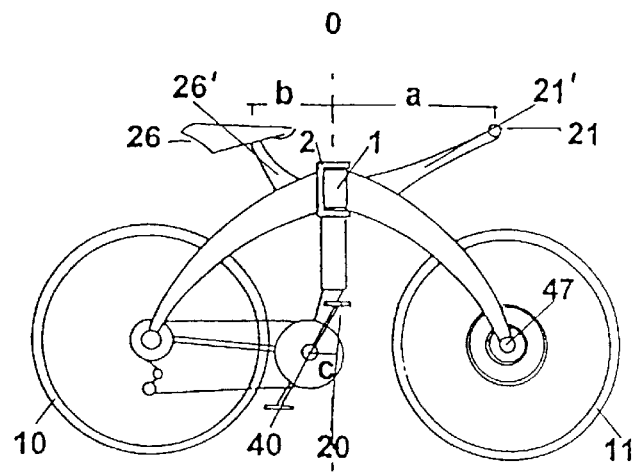
FIG. 21 shows an electrical bicycle in accordance with the invention having front wheel drive and a vertical pivot mechanism in side view.

The electrical bicycle of FIG. 21 has a front wheel drive given by a wheel hub motor (47) with an additional rear wheel drive effected by means of a pedal crank (40) located at the pivot mechanism.

Figure 22:
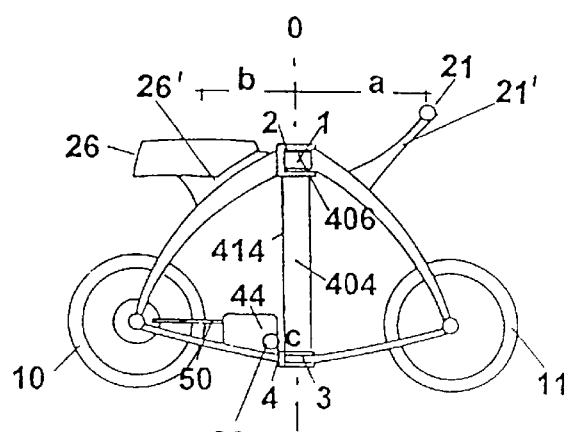
FIG. 22 shows an electrical scooter in accordance with the invention having front wheel drive and a vertical pivot mechanism in side view.

The electrical scooter of FIG. 22 has a container (414) for electrical storage cells (404) disposed at the pivot mechanism. A plug (406) for connection to a charging unit is disposed on the upper end of the pivot mechanism. Drive is effected by means of an electrical motor (44) located on the lower end of the pivot mechanism. The wheel axes are driven by means of a cardan shaft (50). The foot rests (22) act as the lower steering lever arm (c).

Figure 23:
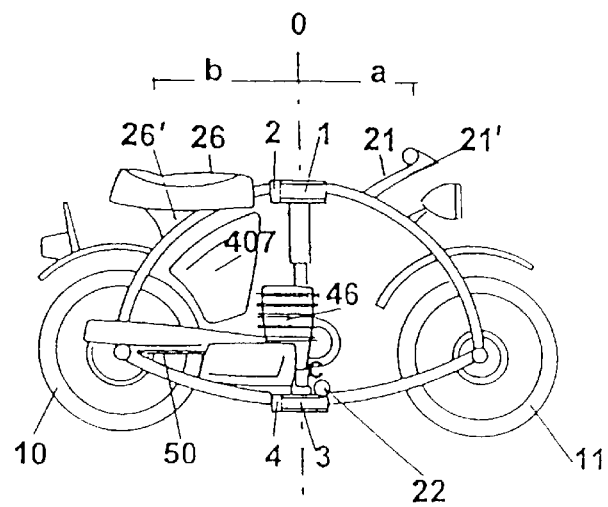
FIG. 23 shows a motorized bicycle in accordance with the invention having rear wheel drive and a vertical pivot mechanism in side view.

FIG. 23 shows a motorcycle in accordance with the invention. The combustion engine (36) is hereby located between the upper pivot (1, 2) and the lower pivot axes (3, 4). The tank (407) is integrated into the rear unit. The rear wheel is driven via a cardan shaft (50). In this case as well, the foot rests (22) serve as the lower steering lever arm (c) to support steering. Together with the upper steering lever arm (a, b) the operator can influence the equilibrium in the pivot axis (0) at three force introduction points.

Figures 24, 24A:
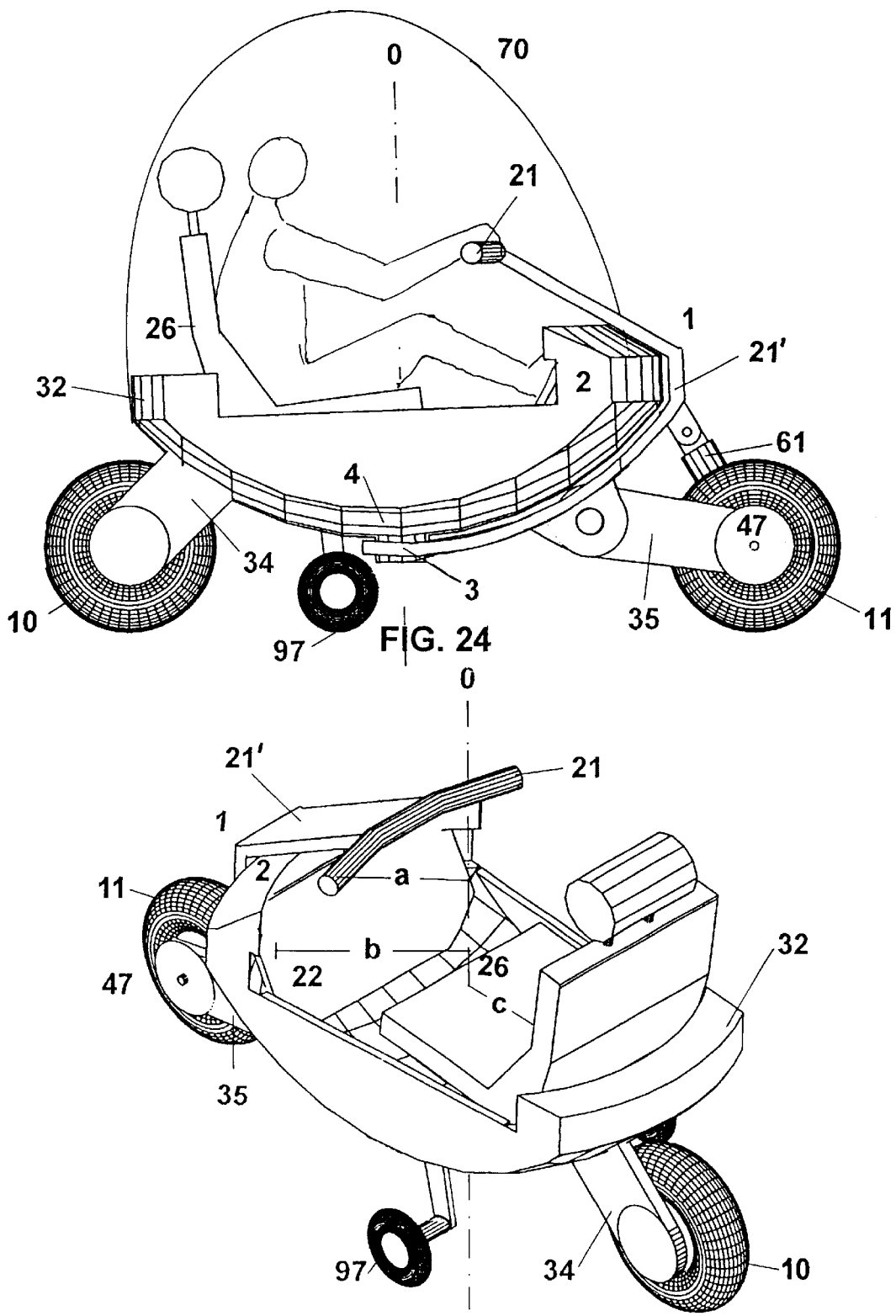
FIG. 24 shows an electrical scooter in accordance with the invention having a closed compartment and support wheels in side view.
FIG. 24a shows the electrical scooter of FIG. 24 without compartment and in isometric view.

FIG. 24 shows an electrical drive enclosed scooter in accordance with the invention in which the rear wheel suspension (32) consists essentially of a self-supporting shell construction expanded into an operator compartment (70) having a cover made from acrylic glass. The pivot (3, 4) is located at the bottom of this compartment (70) to which the front wheel suspension (33) is borne for rotation. The front wheel suspension (33) is also mounted for rotation to the circular arc forward portion of the rear wheel suspension (32). When standing, this electrical scooter has two support wheels (96), for purposes of stabilization, which can be pivoted-in. Drive is effected by means of a wheel hub motor (47) at the front wheel (11).

Figure 25:
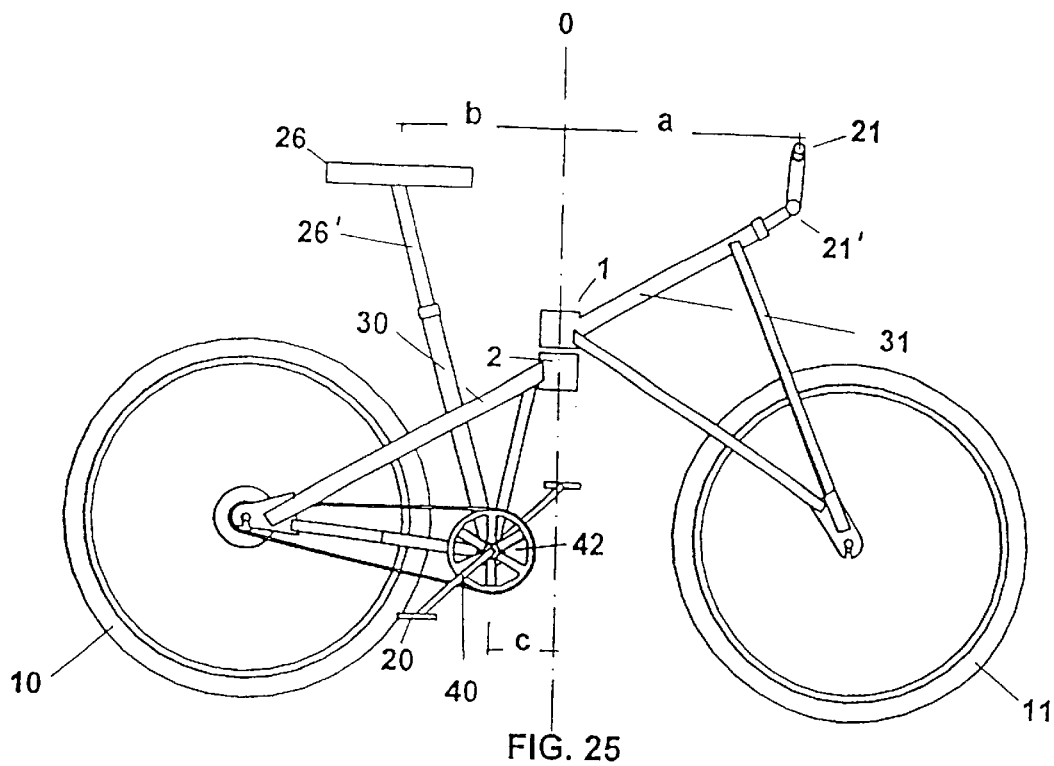
FIG. 25 shows a folding bicycle in accordance with the invention having rear wheel drive and a vertical pivot mechanism in side view.

FIG. 25 shows a folding bicycle in accordance with the invention with which the front wheel suspension (31) and the rear wheel suspension (30) are configured as tubular frames. They are disposed in displaced relationship relative to each other on an upper pivot (1, 2) so that the bicycle can be folded together to assume half its length.

Figure 25A:
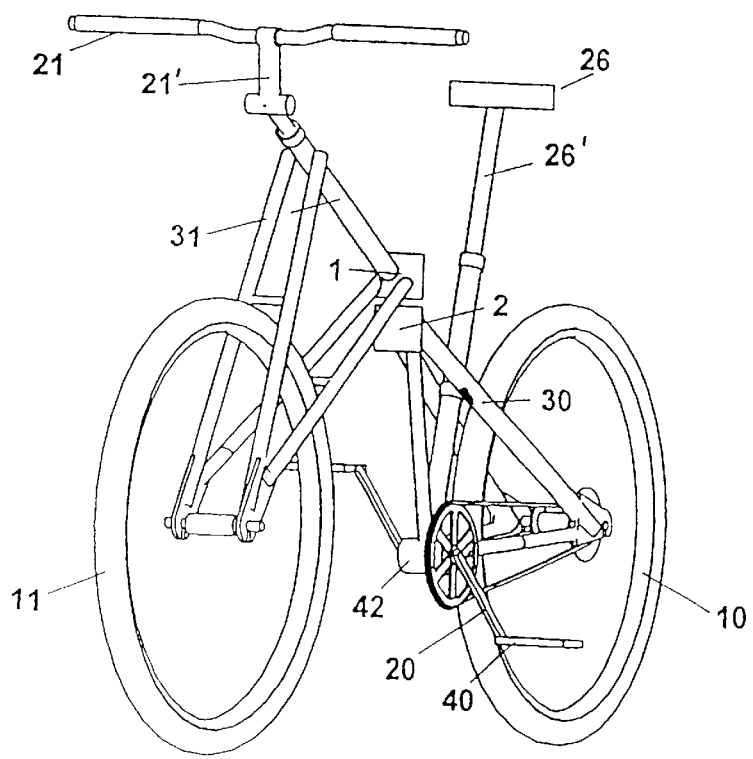
FIG. 25a shows the folding bicycle of FIG. 25 in a perspective representation.

FIG. 25a shows a perspective view of this folding bicycle.

Figure 26:
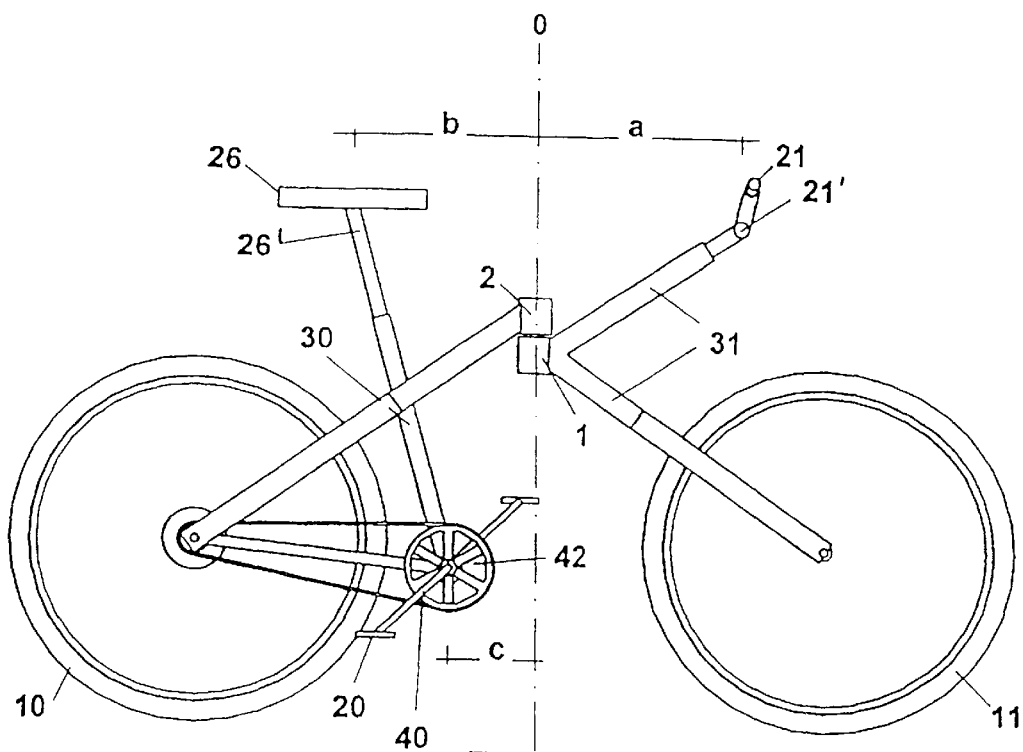
FIG. 26 shows a folding bicycle in accordance with the invention having rear wheel drive and vertical pivot mechanism in a side view.

FIG. 26 shows folding bicycle in accordance with the invention with which the front wheel suspension (31) and the rear wheel suspension (30) consist essentially of rectangular hollow sections under flexural load. They are displaced with respect to each together at an upper pivot (1, 2) so that the bicycle can be folded together to half of its length.

Figure 26A:
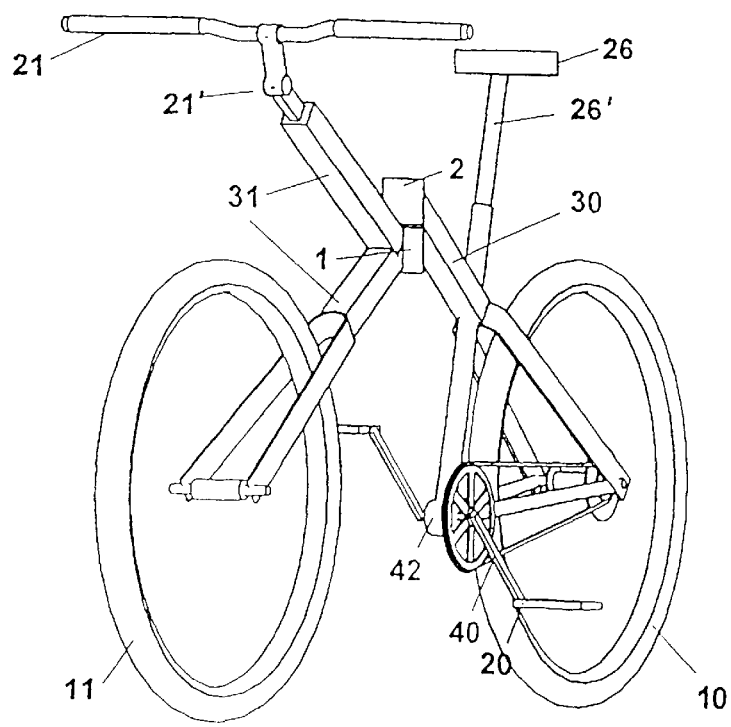
FIG. 26a shows the folding bicycle of FIG. 26 in perspective representation.

FIG. 26a shows this folding bicycle in a perspective representation.

Figure 27:
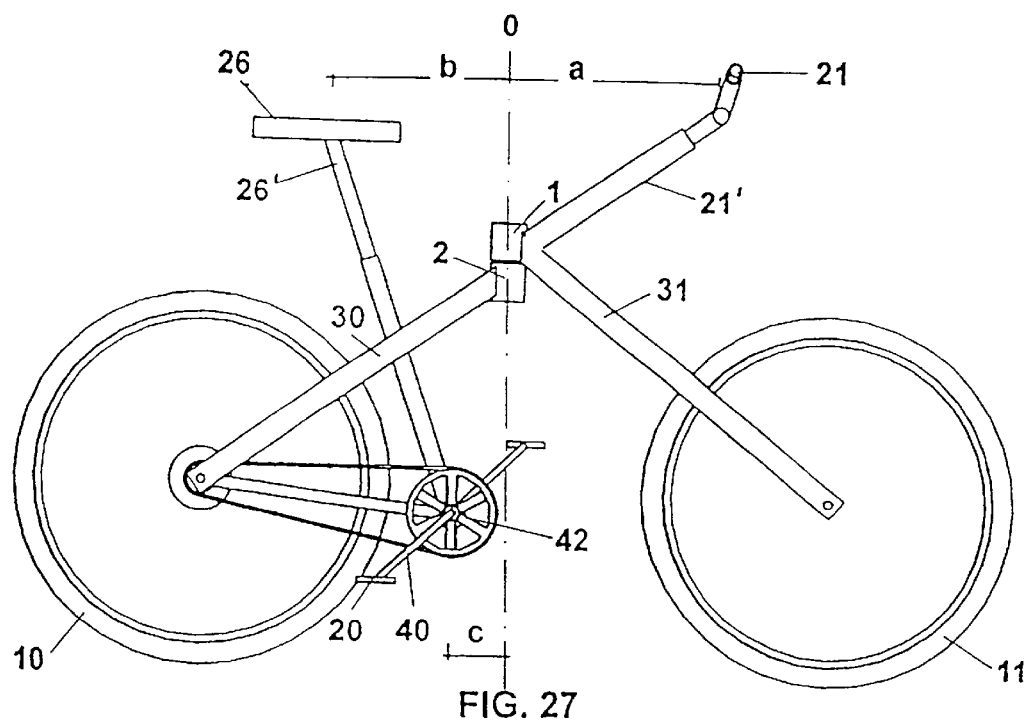
FIG. 27 shows a folding bicycle in accordance with the invention having rear wheel drive and a vertical pivot mechanism in side view.

FIG. 27 shows a folding bicycle in accordance with the invention with which the front wheel suspension (31) and the rear wheel suspension (30) consist of flexural loaded rectangular hollow sections. They are displaced relative to each other at an upper pivot (1, 2) so that the bicycle can be folded together to assume half its length.

Figure 27A:
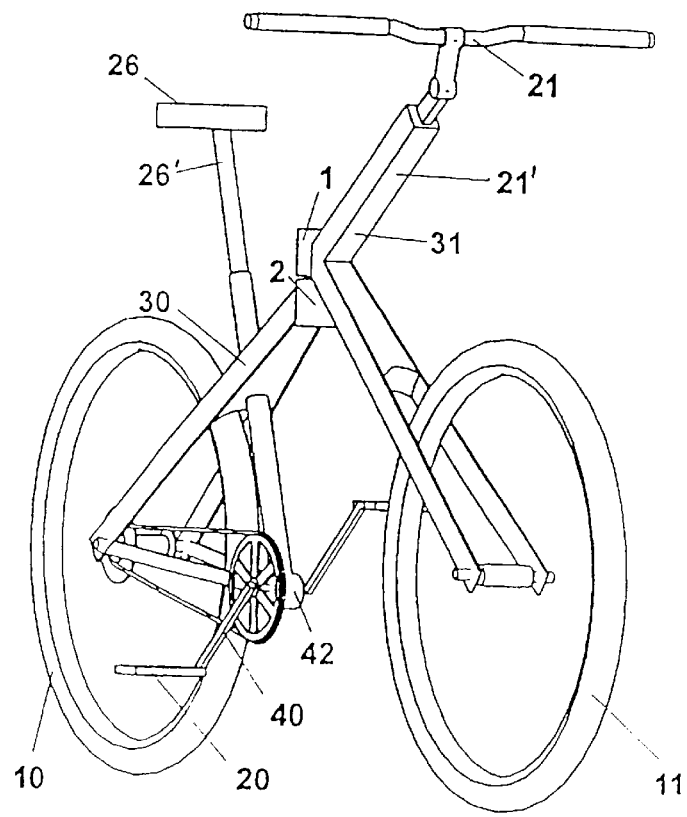
FIG. 27a shows the folding bicycle of FIG. 27 in perspective representation.

FIG. 27a shows this folding bicycle in a perspective representation.

Figure 28:
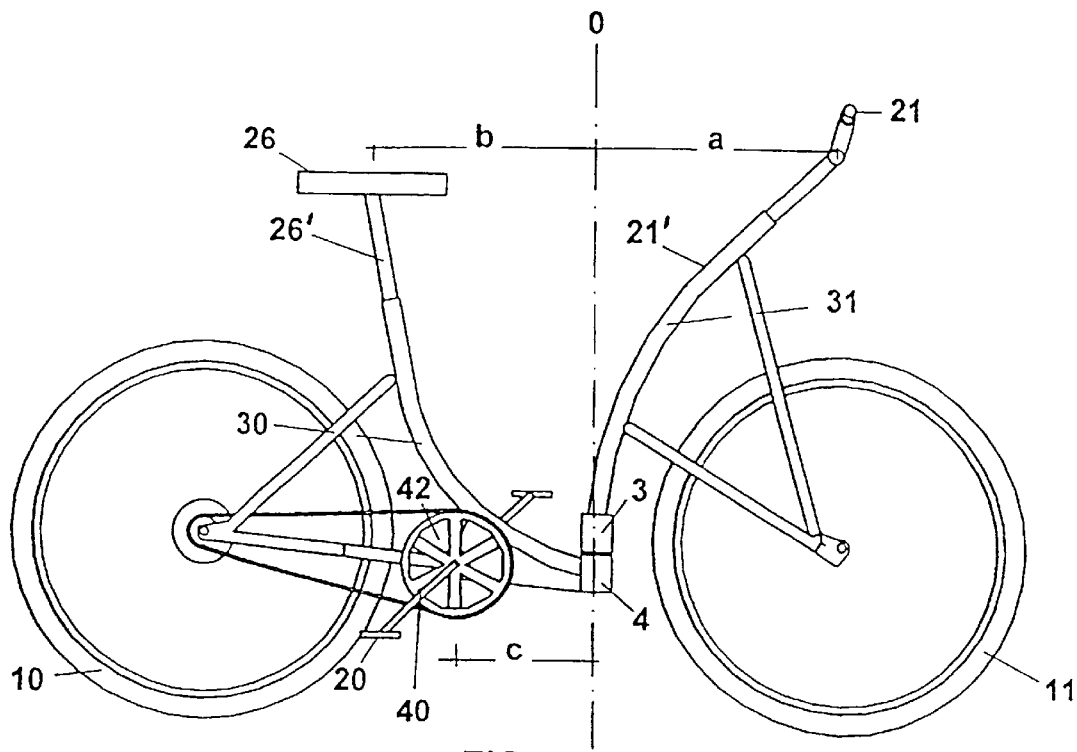
FIG. 28 shows a lady's bicycle in accordance with the invention having rear wheel drive and a vertical pivot mechanism in side view.

FIG. 28 shows a folding lady's bicycle in accordance with the invention with which a V-shaped mounting opening is provided for between the saddle support (26') and the handle bars (21) via the connecting element (21') to the pivot mechanism. The forward wheel suspension (31) and the rear wheel suspension (30) are connected to each other for rotation at a lower pivot (3, 4) disposed below the wheel axes.

Figure 28A:
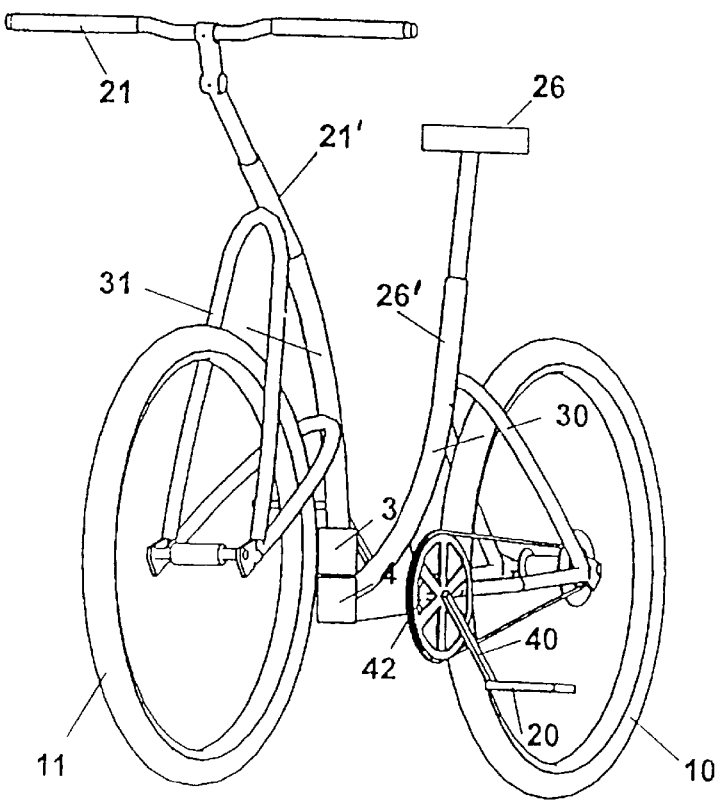
FIG. 28a shows the lady's bicycle of FIG. 28 in perspective representation.

FIG. 28a shows this lady's bicycle in a perspective representation.

Figure 29:
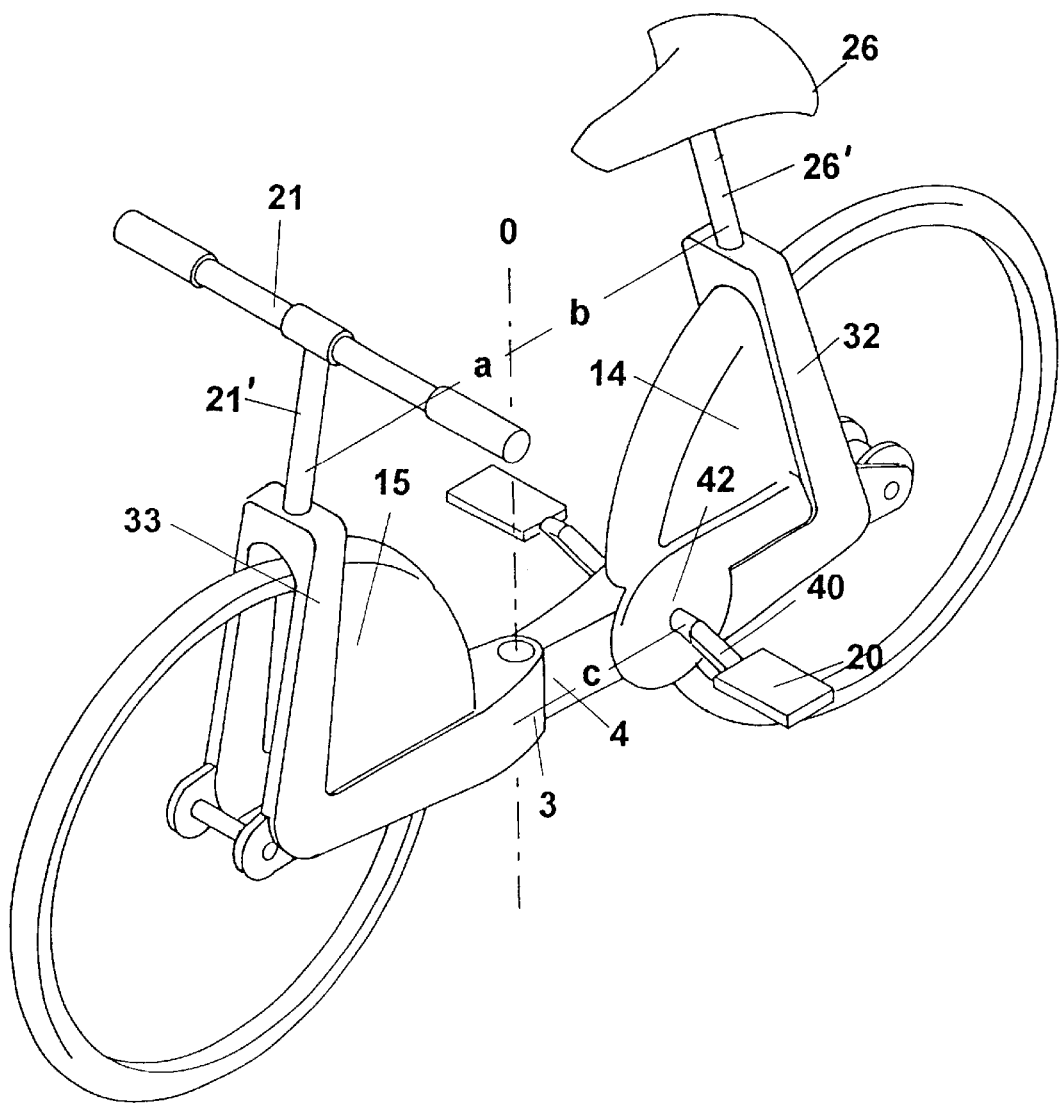
FIG. 29 shows a lady's bicycle in accordance with the invention having rear wheel drive and a vertical pivot mechanism in isometric representation.

A lady's bicycle in accordance with the invention is shown in FIG. 29 with which the forward wheel suspension (33) and the rear wheel suspension (32) are formed as a self-supporting shell structures. The forward and rear units are connected via a lower pivot (3, 4) disposed below the wheel axes. The pedal bearing (42) is displaced in a backward direction with respect to the pivot mechanism and is likewise disposed below the wheel axes. The drive unit and the wheel surfaces facing the U-shaped mounting opening are surrounded up to the pedal crank (40) by a non-supporting protective cover (15, 14). This embodiment has the particular advantage of the low mounting opening between the front and the rear wheel as well as the shielding of the wheel surfaces by means of the front and rear protective covers (15, 14). This bicycle also has two upper steering lever arms (a, b) and a lower steering lever arm (c) which engage at the pivot axis (0).

Figure 30:
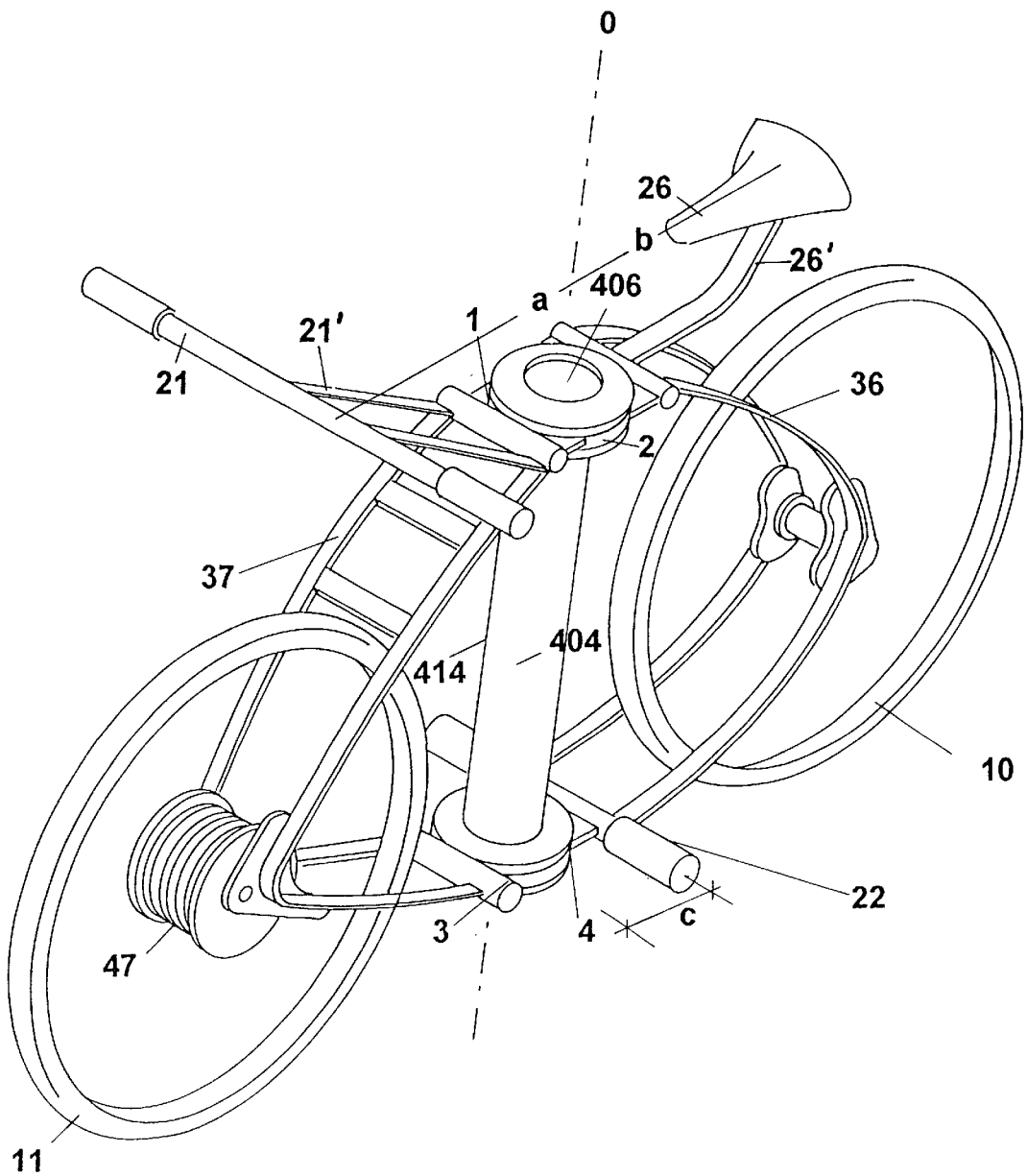
FIG. 30 shows an electrical bicycle in accordance with the invention having front wheel drive and a pivot mechanism tilted in a backward direction in isometric representation.

FIG. 30 shows an electrical bicycle in accordance with the invention in isometric representation. The pivot mechanism is tilted in the backward direction by 7°. A removable container (414) for the acceptance of electrical storage cells (404) is inserted between the upper pivot (1, 2) and the lower pivot (3, 4). The upper pivot (1, 2) and the lower pivot (3, 4) are ring-shaped. A plug (406) which can be closed by a lid is located on the upper pivot (1, 2) for connection to a charging apparatus. The front and the rear units are elastically connected to the upper and the lower pivots (1–4). The front and the rear wheel suspension (36, 37) are configured as resilient elements. Drive is effected by means of a wheel hub motor (47) in the axis of the front wheel (11). The saddle support (26') and the steering lever arm (21') are connected as resilient arms to the rear and front wheel suspensions respectively (36, 37). The foot rests (22) are located substantially below the wheel axes to be optimally effective as the lower steering lever arm.

Figure 31:
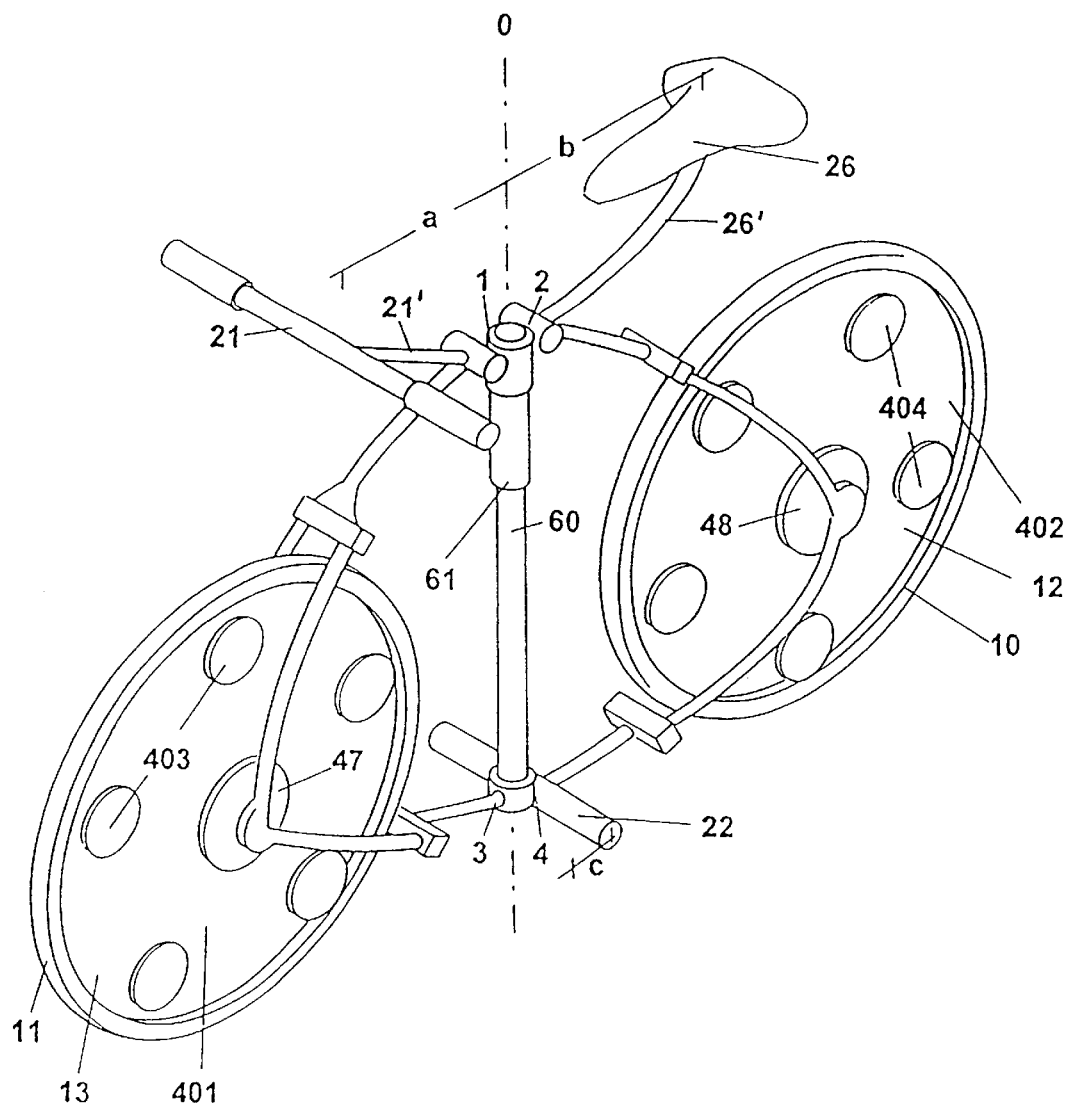
FIG. 31 shows an electrical bicycle in accordance with the invention having front and rear wheel drive and a vertical pivot mechanism in isometric representation.

FIG. 31 shows an electrical bicycle in accordance with the invention having the front wheel (11) and the rear wheel (10) in the form of disks (12, 13). Circular electrical storage cells (403, 404) are inserted into the disks. Drive is effected by means of wheel hub motors (47, 48) in the front wheel (11) and the rear wheel (10). A resilient element (61) is integrated into the pivot mechanism.

Figure 32:
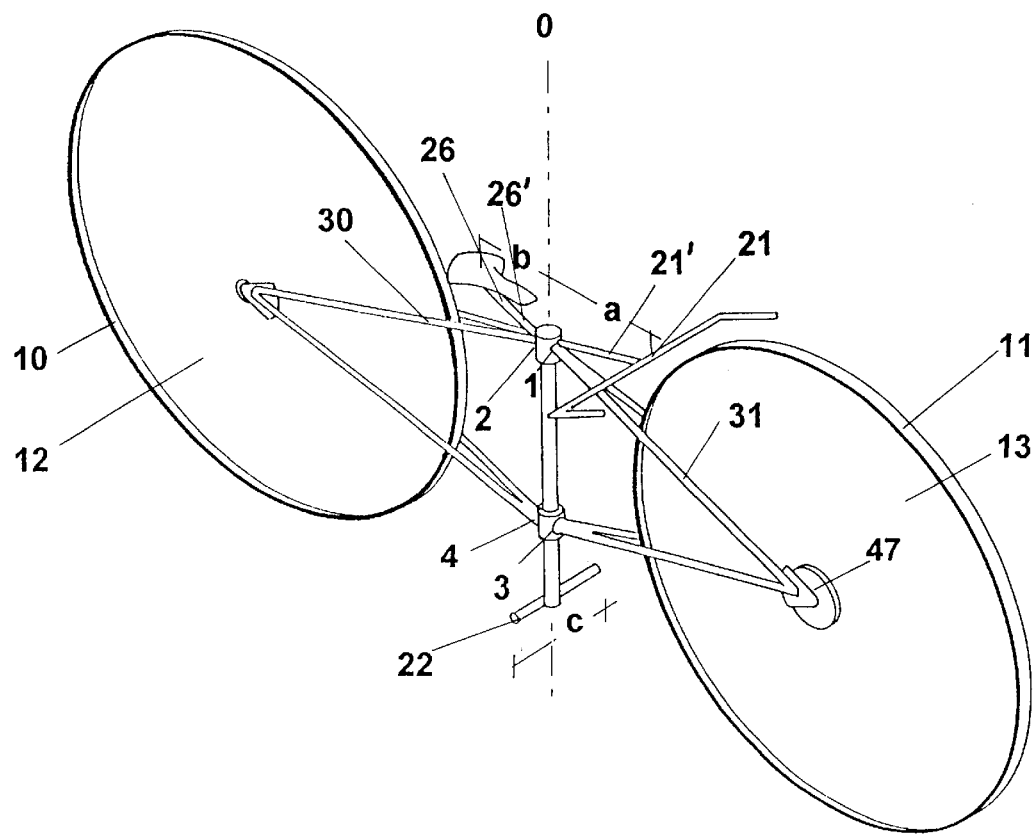
FIG. 32 shows an electrical bicycle in accordance with the invention having front wheel drive and vertical pivot mechanism in isometric representation.

FIG. 32 shows an electrical bicycle in accordance with the invention having extremely large front and rear wheels (11, 10) formed from carbon fiber reinforced disks (12, 13) and are equipped with photo voltaic cells. In order to increase the collector surface, the wheel surface can be correlated or folded. Assuming a bicycle wheel diameter of 1.25 m, a collector surface of at least 4.9 sm results. Assuming a power of approximately 0.5 PS per square meter of collector surface, a drive power of approximately 2.5 PS results for the front wheel hub motor (47). The folding-tilt-steering system is particularly advantageous for this relatively long single track two-wheeled vehicle.

Reference Symbols

| front | | rear | | axes, lever arm | |
|---|---|---|---|---|---|
| pivot mechanism | 1–4 | | | pivot axis | 0 |
| upper pivot | 1 | upper pivot | 2 | 1. upper steering lever arm | a |
| lower pivot | 3 | lower pivot | 4 | 2. upper steering lever arm | b |
| | | | | lower steering lever arm | c |
| | | guide tube | 6 | | |
| front wheel | 11 | rear wheel | 10 | | |
| wheel disc | 13 | wheel disc | 12 | | |
| protecting cover for the wheels | 15 | protecting cover for the wheels | 14 | | |
| | | pedals | 20 | | |
| | | foot rests | 22 | | |
| handle bars | 21 | saddle | 26 | | |
| handlebar connection element | 21' | saddle support | 26' | | |
| | 30–37 | | | | |
| wheel suspension fork | 31 | fork | 31 | | |
| self-supporting shell structure | 33 | self-supporting shell structure | 32 | | |
| one sided leg | 35 | one sided leg | 34 | | |
| frame as resilient element | 37 | frame as resilient element | 36 | | |
| | | additional braces | 38 | | |
| drive | 40-53 | | | | |
| | | pedal crank | 40 | | |
| | | pedal bearing | 42 | | |
| electrical motor | 43 | electrical motor | 44 | | |
| combustion engine | 45 | combustion engine | 46 | | |
| wheel hub motor | 47 | wheel hub motor | 48 | | |
| | | additional cardan shaft | 50 | | |
| resilient element | | resilient element | 60 | | |
| | | driver compartment | 700 | | |
| attachement locations | 71, 73 | attachement locations | 70, 72 | | |
| | | locking mechanism | 74 | | |

Reference Symbols -continued

| front | | rear | | axes, lever arm |
|---|---|---|---|---|
| | | support wheels | 96 | |
| | | tank | 400 | |
| photo voltaic cells | 401 | photo voltaic cells | 402 | |
| electrical storage cells | 403 | electrical storage cells | 404 | |
| hollow structure | 413 | hollow structure | 414 | |
| | | plug | 406 | |

What is claimed is:

1. A single track two-wheeled vehicle comprising:
    a substantially rigid front unit having a front wheel suspension, a front wheel, and integral handle bars, said front wheel for seating at a first area on an underlying support surface, said handle bars mounted in said front unit to substantially maintain a constant orientation of said handle bars relative to a direction of travel of the vehicle;
    a substantially rigid rear unit having a rear wheel suspension, a rear wheel, a saddle, and one of pedals and a rigid foot rest, said rear wheel for seating at a second area on an underlying support surface; and
    a pivot mechanism disposed in a middle location between and connecting said front and said rear units for relative mutual pivoting of said front and said rear units about a substantially vertical pivot axis of said pivot mechanism, wherein a drive unit is disposed in one of said front and said rear units and wherein said handle bars are displaced in a forward direction relative to said pivot mechanism, said front unit constituting a forward upper lever acting on said pivot mechanism, said rear unit constituting a rear upper lever acting on said pivot mechanism, said one of pedals and a rigid footrest constituting a lower lever acting on said pivot mechanism, wherein said pivot axis intersects a plane perpendicular to and bisecting a line segment connecting said first area and said second area, whereby said first wheel and said second wheel describe substantially identical curves during travel of the vehicle.

2. The single track two-wheeled vehicle of claim 1, wherein said drive unit is disposed in said rear unit, said drive unit comprising a pedal bearing having a pedal crank with rotating pedal mounted thereto.

3. The single track two-wheeled vehicle of claim 1, wherein said rear unit comprises a rigid foot rest, said foot rest being one of displaced relative to and coaxial with said pivot axis.

4. The single track two-wheeled vehicle of claim 1, wherein said pivot mechanism comprises at least one pivot.

5. The single track two-wheeled vehicle of claim 4, wherein said pivot axis is perpendicular to a path of straight travel.

6. The single track two-wheeled vehicle of claim 4, wherein said pivot axis, in a neutral position, is longitudinally tilted towards one of said front unit and said rear unit and has a point of intersection with a path of travel lying within tread surfaces of said front wheel and said rear wheel.

7. The single track two-wheeled vehicle according to claim 1, wherein said pivot mechanism is disposed at or above an axes height of said front and said rear wheels.

8. The single track two-wheeled vehicle of claim 4, wherein said pivot mechanism is disposed below an axes height of said front and said rear wheels.

9. The single track two-wheeled vehicle of claim 4, wherein said pivot mechanism comprises a first pivot disposed above an axes height of said front and said rear wheels and a second pivot disposed below an axes height of said front and said rear wheels.

10. The single track two-wheeled vehicle of claim 1, wherein a central guide pipe defines said pivot axis and said handle bars, said front wheel suspension, said saddle support, said rear wheel suspension, and one of said pedals and said foot rest are directly connected to said guide pipe.

11. The single track two-wheeled vehicle of claim 4, wherein said pivot mechanism comprises a guide pipe connected to one of said front and said rear units in a non-rotating fashion and connected to the other of said front and said rear units via an upper and a lower rolling bearing.

12. The single track two-wheeled vehicle of claim 4, wherein said pivot mechanism is disk-shaped and wherein said front and said rear units are connected to each other via a ring-shaped rolling bearing.

13. The single track two-wheeled vehicle of claim 1, wherein said pivot mechanism folds together said front and said rear units.

14. The single track two-wheeled vehicle of claim 4, wherein said front and said rear units engage said pivot mechanism with mutually displaced heights.

15. The single track two-wheeled vehicle of claim 4, wherein said front and said rear units engage said pivot mechanism with sideward displacement.

16. The single track two-wheeled vehicle of claim 1, wherein said front wheel suspension and said rear wheel suspension each consist essentially of tubular frames having points of joined connection, wherein said points of joined connection are configured as pivots and wherein said rear unit can be folded together to form a compact bundle after release of a joined connection in said pivot mechanism.

17. The single track two-wheeled vehicle according to claim 9, wherein said first and said second pivots are directly connected to each other via a connection element.

18. The single track two-wheeled vehicle of claim 9, wherein said first and said pivots are indirectly connected.

19. The single track two-wheeled vehicle of claim 4, further comprising a resilient element disposed above said pivot mechanism coaxial with said pivot axis.

20. The single track two-wheeled vehicle of claim 1, further comprising a pivot and a resilient element to connect said handle bars to said front wheel suspension.

21. The single track two-wheeled vehicle of claim 1, further comprising a pivot and a resilient element for connecting said saddle support to said rear wheel suspension.

22. The single track two-wheeled vehicle of claim 4, further comprising an elastic connection to connect at least one of said front unit and said rear unit to said pivot mechanism.

23. The single track two-wheeled vehicle of claim 4, wherein said pivot mechanism comprises an upper and a lower pivot and further comprising a resilient element disposed between said upper and said lower pivots.

24. The single track two-wheeled vehicle of claim 1, wherein said front wheel suspension and said rear wheel suspension are configured as resilient elements.

25. The single track two-wheeled vehicle of claim 1, wherein at least one of said front wheel suspension and said rear wheel suspension is configured as a tubular frame.

26. The single track two-wheeled vehicle of claim 1, wherein at least one of said front wheel suspension and said rear wheel suspension is configured as a self-supporting shell structure.

27. The single track two-wheeled vehicle of claim 1, wherein at least one of said front wheel suspension and said rear wheel suspension is configured as a fork.

28. The single track two-wheeled vehicle of claim 1, wherein at least one of said front wheel suspension and said rear wheel suspension is configured as a single-sided arm.

29. The single track two-wheeled vehicle of claim 1, wherein said pedals drive a shaft which is coaxial to said pivot axis, said shaft having a coupling at an upper end to drive at least one of said front wheel and said rear wheel via at least one additional cardan shaft.

30. The single track two-wheeled vehicle of claim 4, wherein said drive unit is disposed below said pivot mechanism.

31. The single track two-wheeled vehicle of claim 9, wherein said drive unit is disposed between said first pivot and said second pivot.

32. The single track two-wheeled vehicle of claim 9, further comprising a hollow section connecting said first pivot to said second pivot, an electrical motor, and an electrical storage cell, said motor and said cell disposed within said hollow section.

33. The single track two-wheeled vehicle of claim 4, further comprising a closeable plug disposed on an upper end of said pivot mechanism for connection to a charging unit.

34. The single track two-wheeled vehicle of claim 1, wherein at least one of a wheel rim or a wheel disk serves as a container for accepting electric storage cells.

35. The single track two-wheeled vehicle of claim 1, wherein said drive unit comprises at least one wheel hub motor.

36. The single track two-wheeled vehicle of claim 1, wherein said front and said rear wheels are configured as discs having integrated photo voltaic cells.

37. The single track two-wheeled vehicle of claim 1, wherein said rear unit is a closed operator compartment.

38. The single track two-wheeled vehicle of claim 4, further comprising an operation blocking mechanism to lock said pivot mechanism.

39. The single track two-wheeled vehicle of claim 4, wherein said drive unit comprises one of a pedal crank, an electrical motor and an internal combustion engine.

40. The single track two-wheeled vehicle of claim 4, wherein said drive unit acts on at least one of said front wheel and said rear wheel.

41. The single track two-wheeled vehicle of claim 4, further comprising a steering damper disposed between said front wheel suspension and said rear wheel suspension and cooperating with said pivot mechanism.

42. The single track two-wheeled vehicle of claim 4, further comprising resilient elements engaging said pivot mechanism, wherein a restoring force of said resilient elements must be overcome for any steering motion.

43. The single track two-wheeled vehicle of claim 4, wherein said pivot mechanism has a right handed and a left handed thread.

* * * * *